(12) United States Patent  
Haddock et al.

(10) Patent No.: US 6,663,809 B1  
(45) Date of Patent: Dec. 16, 2003

(54) WIRELESS POLYMERIC TWIST TIE

(75) Inventors: Thomas E. Haddock, Sioux Falls, SD (US); Jeffrey S. Maltas, Sibley, IA (US); Terry L. Langland, Worthington, MN (US); Fern P. Burmeister, Worthington, MN (US)

(73) Assignee: Bedford Industries, Inc., Worthington, MN (US)

( * ) Notice: Subject to any disclaimer, the term of this patent is extended or adjusted under 35 U.S.C. 154(b) by 219 days.

(21) Appl. No.: 09/613,199

(22) Filed: Jul. 10, 2000

(51) Int. Cl.[7] .............................. B28B 3/20; B29C 47/00
(52) U.S. Cl. .............................. 264/176.1; 264/177.13; 264/178 R; 264/210.1
(58) Field of Search ..................... 264/176.1, 177.15, 264/239, 148, 173.13, 178 R, 210.1; 15/244.1, 244.15

(56) References Cited

U.S. PATENT DOCUMENTS

| | | |
|---|---|---|
| 819,869 A | 5/1906 | Dunlap |
| 1,606,053 A | 9/1926 | Bonette |

(List continued on next page.)

OTHER PUBLICATIONS

*Equistar UE 630–000 Ultrathene®EVA for Sheet/Profile Extrusion* (2 pages) obtained from www.matweb.com on May 3, 2000.
Product Data Sheet for EASTAR PETG Copolyester 6763 (5 pages) of Eastman Chemical Company dated Jul. 25, 2000 and obtained from www.eastman.com.
Product Data Sheet for DURASTAR Polymer DS2000 Natural (1 page) of Eastman Chemical Company obtained from www.eastman.com on Jun. 14, 2000.
Material Safety Data Sheet supplied by Equistar Chemicals, LP and dated Jan. 14, 2000 for Equistar UE 630–000 Ultrathene®EVA (7 pages).
Material Safety Data Sheet supplied by Eastman Chamicals Company and dated Apr. 19, 1999 for DURASTAR Polymer DS2000 (6 pages).
Material Safety Data Sheet supplied by Eastman Chemicals Company and dated Sep. 29, 1999 for EASTAR PETG Copolyester 6763 (6 pages).
Material Safety Data Sheet supplied by Eastman Chemicals Company and dated Jul. 20, 1999 for EASTAR PCTG Copolyester 5445 (6 pages).
Product Data Sheet for EASTAR PCTG Copolyester 5445 (3 pages) of Eastman Chemical Company dated May 10, 2000 and obtained from www.freemds.com on May 10, 2000.
Product Brochure for EASTAR PCTG Copolyester 5445 (11 pages) of Eastman Chemcial Company dated Aug., 1997 (Identified as "Publication MBS–94A").
Product Data Sheet for EASTAR PCTG Copolyester 5445 (4 pages) of Eastman Chemcial Company dated Sep. 7, 1999 and obtained from www.eastman.com on Sep. 21, 1999.
Product Data Sheet for Equistar UE 630–000 Ultrathene®EVA (1 page) of Equistar Chemicals, LP dated Nov., 1991.
Product Data Sheet for Equistar UE 631–04 Ultrathene®EVA (1 page) of Equistar Chemicals, LP dated Mar., 1999.
Product Brochure entitled *Eastman's Clear Polymers: Exceptional Resins for Injection Molding* (19 pages) of Eastman Chemical Company dated Mar., 2000 (Identified as "Publication PP–19").

(List continued on next page.)

*Primary Examiner*—Donald J. Loney
(74) *Attorney, Agent, or Firm*—Kinney & Lange, P.A.

(57) ABSTRACT

A twist tie, the twist tie incorporating a thermoplastic copolyester.

36 Claims, 5 Drawing Sheets

U.S. PATENT DOCUMENTS

| | | | | |
|---|---|---|---|---|
| 2,465,319 | A | 3/1949 | Whinfield | 260/75 |
| 2,608,720 | A | 9/1952 | Meissner | 18/19 |
| 2,654,124 | A | 10/1953 | Layte | 18/5 |
| 2,685,707 | A | 8/1954 | Llewellyn et al. | 18/55 |
| 2,750,631 | A | 6/1956 | Johnson | 18/57 |
| 2,972,791 | A | 2/1961 | Kelem | 24/30.5 |
| 2,973,597 | A | 3/1961 | Powell | 40/21 |
| 3,047,539 | A | 7/1962 | Pengily | 260/75 |
| 3,104,937 | A | 9/1963 | Wyckoff et al. | 18/48 |
| 3,138,904 | A | 6/1964 | Burford | 53/14 |
| 3,164,250 | A | 1/1965 | Paxton | 206/56 |
| 3,283,378 | A | 11/1966 | Cramton | 24/16 |
| 3,290,854 | A | 12/1966 | MacMurray | 53/14 |
| 3,334,805 | A | 8/1967 | Halbach | 229/62 |
| 3,370,328 | A | 2/1968 | Hilton | 24/16 |
| 3,444,267 | A | 5/1969 | Beer | 260/876 |
| 3,444,269 | A | 5/1969 | Beer | 260/876 |
| 3,470,685 | A | 10/1969 | Hall et al. | 57/140 |
| 3,494,522 | A | 2/1970 | Kim et al. | 225/97 |
| 3,520,963 | A | 7/1970 | Allseits et al. | 264/90 |
| 3,535,746 | A | 10/1970 | Thomas, Jr. | 24/30.5 |
| 3,540,184 | A | 11/1970 | Ashton | 53/14 |
| 3,565,738 | A | 2/1971 | Kirkpatrick | 161/38 |
| 3,604,066 | A | 9/1971 | Moon | 24/30.5 R |
| 3,633,247 | A | 1/1972 | Clayton | 24/30.5 PB |
| 3,662,434 | A | 5/1972 | Clayton | 24/30.5 P |
| 3,726,079 | A | 4/1973 | Feild et al. | 432/167 |
| 3,759,647 | A | 9/1973 | Schrenk et al. | 425/131 |
| 3,791,129 | A | 2/1974 | Shuford | 57/140 R |
| 3,882,573 | A | 5/1975 | Thomas, Jr. | 24/30.5 T |
| 3,884,606 | A | 5/1975 | Schrenk | 425/133.5 |
| 3,896,991 | A | 7/1975 | Kozlowski et al. | 229/55 |
| 3,962,524 | A | 6/1976 | Miyamoto et al. | 428/435 |
| 3,966,381 | A | 6/1976 | Suh | 425/376 |
| 3,983,202 | A | 9/1976 | Skoroszewski | 264/147 |
| 3,985,847 | A | 10/1976 | Hyun | 264/51 |
| 4,008,295 | A | 2/1977 | Koshida et al. | 260/876 R |
| 4,022,863 | A | 5/1977 | Karass et al. | 264/210 R |
| 4,034,013 | A | 7/1977 | Lane | 260/835 |
| 4,079,114 | A | 3/1978 | Bonner | 264/210 R |
| 4,079,484 | A | 3/1978 | Nakama | 24/16 PB |
| 4,083,914 | A | 4/1978 | Schippers et al. | 264/147 |
| 4,096,202 | A | 6/1978 | Farnham et al. | 260/873 |
| 4,194,772 | A | 3/1980 | Hurd et al. | 292/256.65 |
| 4,317,764 | A | 3/1982 | Sheer | 524/449 |
| 4,342,846 | A | 8/1982 | Silberberg | 525/64 |
| 4,358,466 | A | 11/1982 | Stevenson | 426/106 |
| 4,392,897 | A | 7/1983 | Herrington | 156/66 |
| 4,444,949 | A | 4/1984 | Liu | 525/67 |
| 4,451,422 | A | 5/1984 | Yui et al. | 264/178 |
| 4,518,448 | A | 5/1985 | Henry et al. | 156/86 |
| 4,567,236 | A | 1/1986 | Goldwasser et al. | 525/127 |
| 4,578,437 | A | 3/1986 | Light et al. | 525/444 |
| 4,797,313 | A | 1/1989 | Stolk et al. | 428/150 |
| 4,965,135 | A | 10/1990 | Im et al. | 428/412 |
| 5,004,356 | A | 4/1991 | Matsui | 383/63 |
| 5,040,902 | A | 8/1991 | Eaton et al. | 383/7 |
| 5,106,562 | A | 4/1992 | Blemberg et al. | 264/171 |
| 5,120,138 | A | 6/1992 | Midgley et al. | 383/7 |
| 5,128,409 | A | 7/1992 | Gagger | 525/67 |
| 5,154,964 | A | 10/1992 | Iwai et al. | 428/156 |
| 5,188,461 | A | 2/1993 | Sorensen | 383/63 |
| 5,238,631 | A | 8/1993 | Stolk et al. | 264/147 |
| 5,324,307 | A | 6/1994 | Jarrett et al. | 606/219 |
| 5,342,687 | A | 8/1994 | Iwai et al. | 428/402 |
| 5,348,699 | A | * 9/1994 | Meyer et al. | 204/176.1 |
| 5,378,796 | A | 1/1995 | George et al. | 528/279 |
| 5,382,628 | A | 1/1995 | Stewart et al. | 525/174 |
| 5,436,051 | A | 7/1995 | Donaruma et al. | 428/950 |
| 5,486,588 | A | 1/1996 | Morita | 528/15 |
| 5,509,734 | A | 4/1996 | Ausnit | 383/63 |
| 5,519,982 | A | 5/1996 | Herber et al. | 53/412 |
| 5,545,486 | A | 8/1996 | Asano et al. | 428/542.8 |
| 5,580,924 | A | 12/1996 | Wildi et al. | 525/65 |
| 5,582,923 | A | 12/1996 | Kale et al. | 428/523 |
| 5,602,201 | A | 2/1997 | Fujiguchi et al. | 525/67 |
| 5,605,948 | A | 2/1997 | Dumont et al. | 524/162 |
| 5,607,748 | A | 3/1997 | Feltman | 428/156 |
| 5,607,757 | A | 3/1997 | Dalton | 442/301 |
| 5,620,103 | A | 4/1997 | Vlah et al. | 211/55 |
| 5,633,340 | A | 5/1997 | Hoffman et al. | 528/272 |
| 5,646,233 | A | 7/1997 | Sakashita et al. | 528/176 |
| 5,656,715 | A | 8/1997 | Dickerson et al. | 528/271 |
| 5,664,296 | A | 9/1997 | May | 24/30.5 R |
| 5,773,554 | A | 6/1998 | Dickerson et al. | 528/271 |
| 5,804,617 | A | 9/1998 | Hoffman et al. | 524/37 |
| 5,824,398 | A | 10/1998 | Shih | 428/211 |
| 5,852,152 | A | 12/1998 | Walton et al. | 526/348.1 |
| 5,859,116 | A | 1/1999 | Shih | 524/493 |
| 5,878,549 | A | 3/1999 | Littmann et al. | 53/412 |
| 5,891,963 | A | 4/1999 | Brookhart et al. | 525/326.1 |
| 5,904,425 | A | 5/1999 | May | 383/203 |
| 5,955,565 | A | 9/1999 | Morris et al. | 528/271 |
| 5,989,683 | A | 11/1999 | Haddock et al. | 428/167 |
| 5,998,028 | A | 12/1999 | Eckart et al. | 428/383 |

OTHER PUBLICATIONS

Product Brochure entitled *Extrusion of tubes and Profiles From Provista Copolymer* (15 pages) of Eastman Chemical Company dated Mar., 2000 (Identified as "Publication TRS–65G").

Product Brochure for EASTAR PCTG Copolyester 5445 (18 pages) of Eastman Chemical Company entitled *Extrusion of Film and Sheeting* published prior to Sep. 24, 1999.

* cited by examiner

WIRELESS POLYMERIC TWIST TIE

CROSS-REFERENCE TO RELATED APPLICATION(S):

NONE

BACKGROUND OF THE INVENTION

The present invention generally relates to a method of manufacturing a wireless twist tie and to the wireless twist tie produced by this method. More particularly, the present invention relates to a wireless twist tie that incorporates a thermoplastic copolyester and to a method of producing this wireless twist tie.

Twist ties are commonly used for a variety of different fastening and securing purposes. Twist ties typically look like thin ribbons of material. Twist ties are typically produced initially as long strands of ribbon; these strands may then be cut to form twist ties of a select length. Individual twist ties typically have lengths ranging from about two inches up to about ten inches, though twist ties designed for any particular purpose may have a length outside of this general range.

One common use of twist ties concerns closure of packages having an open end. To close the package, packaging material located adjacent to the open end is gathered. The twist tie is extended around the gathered packaging material and opposing ends of the twist tie are then placed adjacent to each other. These opposing ends of the twist tie are then twisted about each other relative to the remainder of the twist tie to secure the opposing ends together and prevent the gathered packaging material from reopening. Thus, the act of twisting the opposing ends of the twist tie about each other permits the twist tie to act as a locking device. One example of this entails use of the twist tie to close the opening of a bread wrapper to prevent the bread within the bread wrapper from being exposed to atmosphere.

Many twist ties include a length of metal wire that may be enclosed in a covering material, such as plastic or paper. Twist ties that include metal wire are subsequently referred to as wire twist ties. Wire twist ties have many advantageous properties that have led to widespread use of wire twist ties. For example, wire twist ties may generally be readily applied to packages to seal or close the packages using either manual application techniques or high-speed automated mechanical application techniques. In addition, the fastening ability of wire twist ties is typically not significantly affected by multiple twist tie fastening and unfastening cycles. Also, wire twist ties typically are usable over a wide range of temperatures without experiencing any significant reduction in fastening capability.

Wire twist ties are used in many food packaging applications. However, such use of wire twist ties in food packaging applications sometimes creates difficulties. For example, the wire portion of wire twist ties typically makes the wire twist ties unsuitable for use in microwave ovens.

This problem arises because the wire portion of the wire twist ties generally causes undesirable arcing when the wire twist tie is subjected to microwave radiation at intensities typically found in microwave ovens. Thus, food packages that include wire twist ties must be opened by removing the wire twist tie prior to placement of the food package in the microwave oven. This is an undesirable step, since many food packaging applications call for the food, when heated in a microwave oven, to be heated in the microwave oven while maintaining the food packaging in a generally closed configuration. While small holes are sometimes added to the packaging to prevent the package from overexpanding and blowing out, large holes and openings are typically not desirable. The large holes and openings, such as those that would exist in the absence of the wireless twist tie, are undesirable, since such large openings may permit the food to excessively dry out during heating in the microwave oven.

Use of wire twist ties in food packaging applications is also undesirable for an additional reason. Specifically, when food is commercially packaged for distribution to the public, it is desirable for the packaging to allow inspection of packaged food for contamination by foreign objects. One common method of inspecting food products entails use of metal detectors to confirm that no metal scrap or shards have inadvertently been incorporated in the food product during production or packaging of the food product. Wire twist ties preclude such use of a metal detector, since each package that is closed with a wire twist tie would typically generate a response by the metal detector indicating the presence of metal in the food package. Thus, rather than simply detecting the presence of any undesired metal in the packaged food, the metal detector would also indicate, for each package, the presence of the wire twist tie.

A number of different, non-metallic closures, such as wireless twist ties excluding metal wire, have been developed. While these various wireless twist ties do typically solve the problems described above relating to microwave heating and metal detection, these wireless twist ties have not proven entirely satisfactory. One problem is that some of these wireless twist ties exhibit excessive memory and consequently do not support secure closure of packaging after just a few wireless twist tie opening and closing cycles. Another problem derives from consumer perceptions that wireless twist ties are difficult to use, due to a high degree of twist tie rigidity that may make it perceptibly more difficult for a person with less dexterity to manually open and close the twist tie. Finally, many wireless twist ties do not exhibit sufficient degrees of strength while also exhibiting significant degrees of elasticity and flexibility. This lack of strength in combination with any lack of flexibility and/or elasticity may cause such wireless twist ties to break, or otherwise exhibit application difficulties, when attempts are made to attach such wireless twist ties using high-speed mechanical application machines in commercial food packaging operations.

The wireless twist tie of the present invention solves these difficulties that are exhibited by many existing wireless twist ties. For example, the wireless twist ties of the present invention exhibit a significantly minimized, or even eliminated, tendency to break during application by commercially available twist tie application machines, as compared to prior wireless twist ties. Also, the wireless twist ties of the present invention exhibit a soft feel due to a combination of enhanced flexibility and enhanced elasticity, as compared to prior wireless twist ties.

Furthermore, this soft feel that is produced by the enhanced elasticity. and enhanced flexibility provides the wireless twist tie of the present invention with application characteristics that are more user friendly to those with reduced dexterity in their hands, as compared to prior wireless twist ties. Thus, for those with reduced hand dexterity, the wireless twist ties of the present invention are easier to use than many prior wireless twist ties. Finally, due to the non-metallic nature of the wireless twist ties of the present invention, the wireless twist ties of the present invention continue to provide an adequate solution in those applications where the wireless twist ties will be exposed to microwave radiation and in those applications where the wireless twist tie will be subjected to metal detection techniques. Furthermore, these advantages of the wireless twist tie of the present invention are achieved while using relatively inexpensive components that help to make the wireless twist tie of the present invention less expensive to manufacture,. as compared to many prior wireless twist ties.

BRIEF SUMMARY OF THE INVENTION

The present invention includes a twist tie. The twist tie incorporates a thermoplastic copolyester. The present invention further includes a method of forming the twist tie, a wireless twist tie, and a method of forming the wireless twist tie.

DETAILED DESCRIPTION

Figure 1:
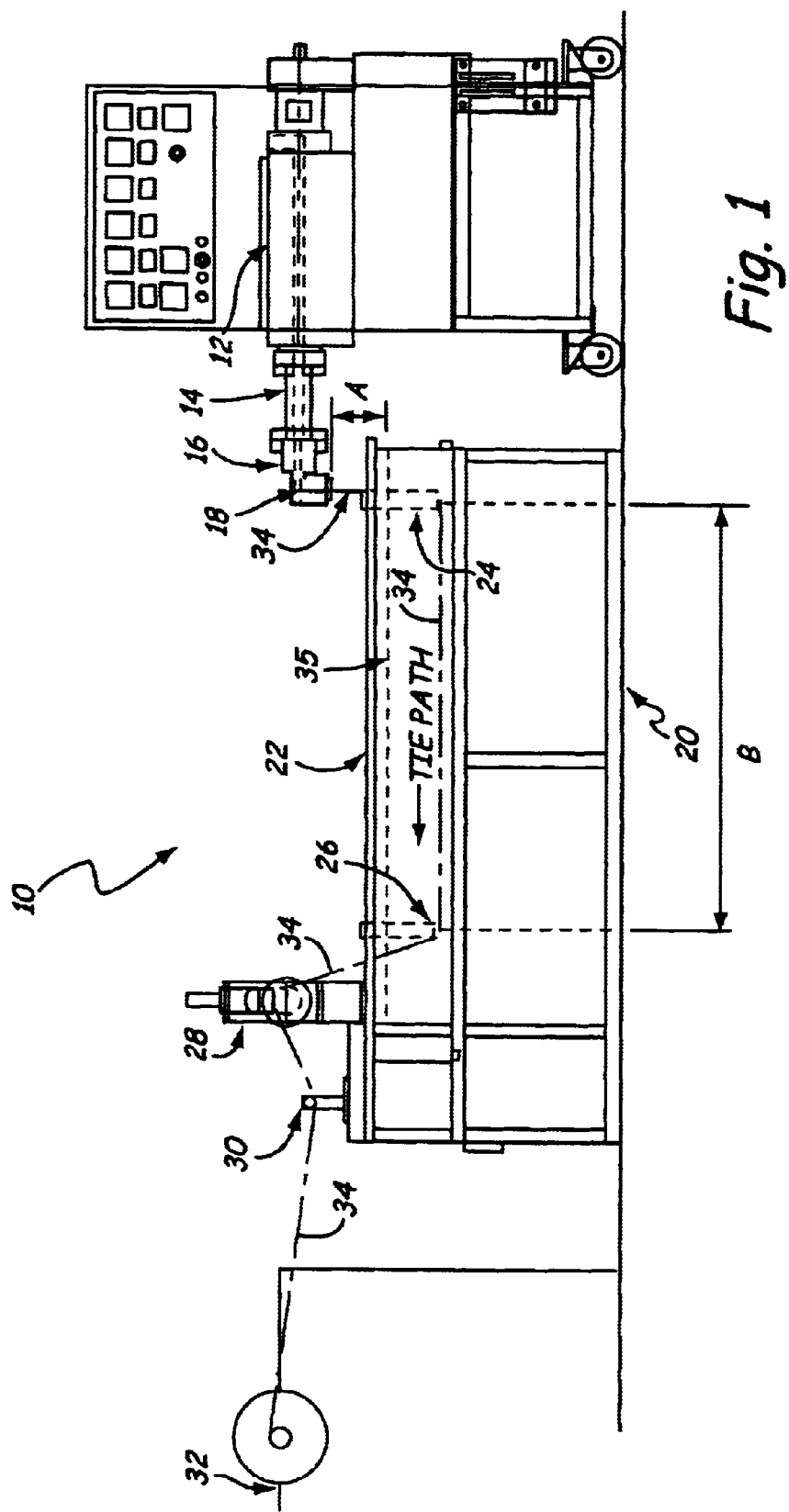
FIG. 1 is a side plan view of a system for producing twist ties of the present invention.

The present invention generally relates to a method of manufacturing a wireless twist tie and to the wireless twist tie produced by this method. More particularly, the present invention relates to the wireless twist tie that incorporates a thermoplastic copolyester and to a method of producing this wireless twist tie.

The wireless twist tie of the present invention may be based upon a number of different components. For example, the wireless twist tie may incorporate a primary polymeric material, such as a variety of different thermoplastic copolyesters. Some non-exhaustive examples of suitable thermoplastic copolyesters include (1) PCTG (a glycol-modified copolyester of PCT (polycyclohexylene dimethylene terephthalate)), (2) PETG (a glycol-modified copolyester of PET (polyethylene terephthalate)), and (3) PCTA (an acid-modified copolyester of PCT (polycyclohexylene dimethylene terephthalate)). Thus, some non-exhaustive examples of suitable thermoplastic copolymers are glycol-modified copolyesters that include the

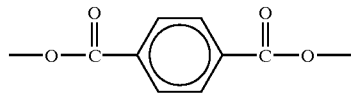

segment, as well as, acid-modified copolyesters that include the

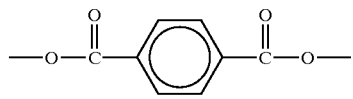

segment. Also, some non-exhaustive examples of suitable thermoplastic copolymers are glycol-modified copolyesters. that include a terephthalic group and acid-modified copolyesters that include a terephthalic group. The primary polymeric material may incorporate one or more of the thermoplastic copolyesters, such as the PCTG, the PETG, and/or the PCTA. Any copolyester(s), such as the PCTG, the PETG, and/or the PCTA, may be incorporated in the primary polymeric material at any weight ratio relative to any other copolyester(s) that is(are) included in the primary polymeric material, provided that the primary polymeric material is capable of being melted and extruded to form wireless twist ties in accordance with the present invention.

Whether a single copolyester is used as the primary polymeric material or a combination of different copolyesters make up the primary polymeric material, the primary polymeric material preferably has an inherent viscosity (i.e.: logarithmic viscosity number) of about 0.6 or greater. Such an inherent viscosity value is preferred to ensure that the primary polymeric material contributes a significant amount of toughness to the wireless twist ties produced in accordance with the present invention. The inherent viscosity of the primary polymeric material may be determined in accordance with ASTM Standard Number D5225-98, that is entitled *Standard Test Method for Measuring Solution Viscosity of Polymers with a Differential Viscometer*. A copy of ASTM Standard Number D5225-98 may be obtained from the American Society for Testing and Materials of West Conshohocken, Pennsylvania.

The glycol-modified copolyester of polycyclohexylene dimethylene terephthalate (also referred to herein as (1) "PCTG" and/or as (2) "glycol-modified copolyester of PCT") that may serve as part or all of the primary polymeric material may, as one example, be glycol-modified poly(1,4 cyclohexylene dimethylene terephthalate). One suitable example of the PCTG is EASTAR® PCTG 5445 copolyester. The Chemical Abstract Service (CAS) Registry Number of the EASTAR® PCTG 5445 copolyester is 025640-14-6. EASTAR® PCTG 5445 copolyester may be obtained from Eastman Chemical of Kingsport, Tenn. Other suitable non-exhaustive examples of the PCTG include EASTAR® Copolyester DN 001, EASTAR® Copolyester DN 003, and EASTAR® Copolyester DN 004 that are also available from Eastman Chemical of Kingsport, Tenn. Glycol-modified poly(1,4 cyclohexylene dimethylene terephthalate) generally has the structure that is provided in Formula I below:

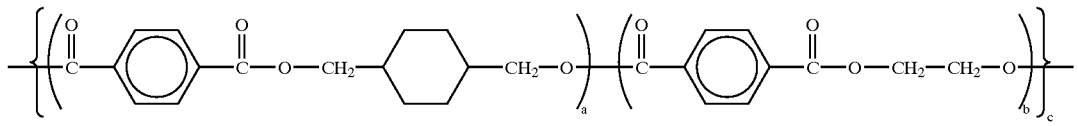

where a, b, c are arbitrary numbers that merely indicate the random order of the a, b, and c segments in the PCTG, but do not say anything about the amount of the a segments relative to the amount of the b segments in the PCTG. Any amount of the a segments relative to the amount of the b segments in the PCTG may be used so long as the primary polymeric material is capable of being melted and extruded to form wireless twist ties in accordance with the present invention. Some possible techniques for forming PCTG that may be used in preparing wireless twist ties of the present invention are provided in U.S. Pat. No. 5,656,715, which is hereby incorporated by reference in its entirety.

Chemically, EASTAR® PCTG 5445 copolyester may be characterized as 1,4 cyclohexylene dimethylene ethylene terephthalate. EASTAR® PCTG 5445 copolyester is used as an amorphous (non-crystalline) thermoplastic polyester of the PCT (polycyclohexylene dimethylene terephthalate) family. The "G" in PCTG indicates the use of a second glycol group in making the polymer. The addition of this second glycol group results in a copolyester that may be processed by extrusion methods.

Some film properties, thermal properties, rheological properties, and mechanical properties of the EASTAR® PCTG 5445 copolyester are provided in Tables 1, 2, 3, and 4, below, respectively:

TABLE 1

Film Properties of EASTAR ® PCTG 5445 Copolyester

| PROPERTIES[a] | ASTM METHOD | VALUE |
| --- | --- | --- |
| Thickness of film tested | D 374 | 10 mils |
| Density @ 23° C. | D 1505 | 1.23 g/cm$^3$ |
| Haze | D 1003 | 1.0% |
| Gloss @ 450 | D 2457 | 98 |
| Percent Total Transmittance | D 1003 | 91 |
| Refractive Index, $N_d$ | D 542 | 1.56 |
| Elmendor Tear Strength (M.D.) | D 1922 | >3,000 g |
| Elmendor Tear Strength (T.D.) | D 1922 | >3,000 g |
| Tensile Strength @ Yield (M.D.) | D 882 | 45 MPa (6,500 psi) |
| Tensile Strength @ Yield (T.D.) | D 882 | 44 MPa (6,400 psi) |
| Tensile Strength @ Break (M.D.) | D 882 | 57 MPa (8,300 psi) |
| Tensile Strength @ Break (T.D.) | D 882 | 53 MPa (7,700 psi) |
| Tensile Modulus (M.D.) | D 882 | 1,600 MPa (2.3 x 10$^5$ psi) |
| Tensile Modulus (T.D) | D 882 | 1,600 MPa (2.3 x 10$^5$ psi) |
| Coefficient of Friction, Film-to-Film | D 1894 | 0.5 |
| Water Vapor Transmission Rate[b] | F 372 | 7 g/m$^2$.24h |
| Water Vapor Transmission Rate[b] | F 372 | 0.5 g/100 in.$^2$.24h |
| Gas Permeability (CO$_2$) | D 1434 | 49 cm$^3$.mm/m$^2$.24h.atm |
| Gas Permeability (CO$_2$) | D 1434 | 125 cm$^3$.mil/100 in.$^2$.24.atm |
| Gas Permeability (O$_2$) | D 3985 | 11 cm$^3$.mm/m$^2$.24h.atm |
| Gas Permeability (O$_2$) | D 3985 | 28 cm$^3$.mil/100 in.$^2$.24.atm |
| Dart Impact[c] @ 23° C. (73° F.) | D 1709 Modified | 460 g |
| Dart Impact[c] @ −18° C. (0° F.) | D 1709 Modified | 540 g |

[a]Unless noted otherwise, all tests were run @ 23° C. (73° F.) and 50% relative humidity.
[b]Tests conducted @ 38° C. (100° F.) and 100% relative humidity.
[c]Test conducted using 12.7-mm (½-in.) dia. head, 127-mm (5-in.) dia. clamp, and 660-mm (26-in.) drop

TABLE 2

Thermal Properties of EASTAR ® PCTG 5445 Copolyester

| PROPERTIES, UNITS | ASTM METHOD | VALUE |
| --- | --- | --- |
| Deflection Temperature @ 0.455 MPa (66 psi) | D 648 | 74° C. (165° F.) |
| Deflection Temperature @ 1.82 MPa (264 psi) | D 648 | 65° C. (149° F.) |
| Vicat Softening Point | D 1525 | 86° C. (157° F.) |
| Thermal Conductivity[a] | C 177 | 0.22 W/m.K (1.5 Btu.in./h.ft$^2$.° F.) |
| Glass Transition Temperature | D 3418 | 87° C. (189° F.) |
| Specific Heat @ 10° C. (50° F.) | DSC | 1.09 kJ/kg.K (0.26 cal/g.° C.) |
| Specific Heat @ 30° C. (86° F.) | DSC | 1.14 kJ/kg.K (0.27 cal/g.° C.) |
| Specific Heat @ 50° C. (122° F.) | DSC | 1.21 kJ/kg.K (0.29 cal/g.° C.) |
| Specific Heat @ 70° C. (158° F.) | DSC | 1.24 kJ/kg.K (0.30 cal/g.° C.) |
| Specific Heat @ 100° C. (212° F.) | DSC | 1.64 kJ/kg.K (0.39 cal/g.° C.) |
| Specific Heat @ 120° C. (248° F.) | DSC | 1.70 kJ/kg.K (0.40 cal/g.° C.) |
| Specific Heat @ 140° C. (284° F.) | DSC | 1.76 kJ/kg.K (0.42 cal/g.° C.) |

TABLE 2-continued

Thermal Properties of EASTAR ® PCTG 5445 Copolyester

| PROPERTIES, UNITS | ASTM METHOD | VALUE |
|---|---|---|
| Specific Heat @ 180° C. (356° F.) | DSC | 1.86 kJ/kg.K (0.44 cal/g.° C.) |
| Specific Heat @ 280° C. (536° F.) | DSC | 2.14 kJ/kg.K (0.51 cal/g.° C.) |
| Specific Heat @ 290° C. (554° F.) | DSC | 2.16 kJ/kg.K (0.52 cal/g.° C.) |
| Coefficient of Linear Thermal Expansion | D 696 | 7.5 X $10^{-5}$ mm/mm.° C. (−30° to +40° C.) |
| Melt Density @ 285° C. (545° F.) | D 1238 | 1.08 g/cm$^3$ |

[a]Test run @ 23° C. (73° F.).

TABLE 3

Rheological Properties for EASTAR ® PCTG 5445 Copolyester

| Capillary Parameters: | | |
|---|---|---|
| Diameter (in.) | | 0.05 |
| Length (in.) | | 2.5 |
| Entry Angle | | 90 degrees |
| Initial IV | | 0.71 |

| Shear Rate 1/sec | Apparent Viscosity poise (Pa.s) 260° C. (500° F.) | Apparent Viscosity poise (Pa.s) 280° C. (535° F.) | Apparent Viscosity poise (Pa.s) 300° C. (570° F.) |
|---|---|---|---|
| 15 | 8,705 (870.5) | 4,093 (409.3) | 1,595 (159.5) |
| 30 | 7,179 (717.9) | 3,347 (334.7) | 1,179 (117.0) |
| 75 | 6,437 (643.7) | 2,865 (286.5) | 888 (88.8) |
| 150 | 5,965 (596.5) | 2,671 (267.1) | 777 (77.7) |
| 300 | 5,475 (547.5) | 2,490 (249.0) | 704 (70.4) |
| 750 | 4,224 (422.4) | 2,200 (220.0) | 628 (62.8) |
| 1,500 | 3,044 (304.4) | 1,809 (180.9) | 572 (57.2) |
| 3,000 | 1,927 (192.7) | 1,320 (132.0) | 504 (50.4) |
| Final IV | 0.66 | 0.65 | 0.56 |

TABLE 3-continued

Rheological Properties for EASTAR ® PCTG 5445 Copolyester

| Capillary Parameters: | | |
|---|---|---|
| Diameter (in.) | | 0.05 |
| Length (in.) | | 2.5 |
| Entry Angle | | 90 degrees |
| Initial IV | | 0.71 |

| Shear Rate 1/sec | Shear Stress psi (MPa) 260° C. (500° F.) | Shear Stress psi (MPa) 280° C. (535° F.) | Shear Stress psi (MPa) 300° C. (570° F.) |
|---|---|---|---|
| 15 | 1.894 (0.01306) | 0.890 (0.00614) | 0.347 (0.00239) |
| 30 | 3.124 (0.02154) | 1.456 (0.01004) | 0.513 (0.00354) |
| 75 | 7.002 (0.04828) | 3.116 (0.02148) | 0.966 (0.00666) |
| 150 | 12.978 (0.08948) | 5.810 (0.04006) | 1.690 (0.1165) |
| 300 | 23.820 (0.16423) | 10.835 (0.07470) | 3.063 (0.2112) |
| 750 | 45.950 (0.31684) | 23.926 (0.16496) | 6.828 (0.04708) |
| 1,500 | 66.224 (0.45660) | 39.355 (0.27134) | 12.442 (0.08578) |
| 3,000 | 83.864 (0.57822) | 57.418 (0.39588) | 21.941 (0.15128) |

TABLE 4

Mechanical Properties of EASTAR ® PCTG 5445 Copolyester
(Injection Molded Specimens)

| Properties[a] | ASTM Method | Value |
|---|---|---|
| Specific Gravity | D 792 | 1.23 |
| Tensile Stress @ Break, | D 638 | 57 MPa (7,600 psi) |
| Tensile Stress @ Yield | D 638 | 45 MPa (6,600 psi) |
| Elongation @ Break | D 638 | 340% |
| Flexural Modulus | D 790 | 1,800 MPa (2.7 x $10^5$ psi) |
| Flexural Strength @ Yield | D 790 | 66 MPa (9.500 psi) |
| Rockwell Hardness, R Scale | D 785 | 103 |
| Impact Strength (Notched Izod) @ 23° C. (73° F.) | D 256 | NB[b] |
| Impact Strength (Notched Izod) @ 23° C. (73° F.) | D 256 | NB[b] |
| Impact Strength (Notched Izod) @ −40° C. (−40° F.) | D 256 | 75 J/m |
| Impact Strength (Notched Izod) @ −40° C. (−40° F.) | D 256 | 1.4 ft/lb$_f$/in. |
| Impact Strength (Unnotched) @ 23° C. (73° F.) | D 4812 | NB[c] |
| Impact Strength (Unnotched) @ 23° C. (73° F.) | D 4812 | NB[c] |
| Impact Strength (Unnotched) @ −40° C. (−40° F.) | D 4812 | NB[c] |
| Impact Strength (Unnotched) @ −40° C. (−40° F.) | D 4812 | NB[c] |
| Impact Resistance (Puncture) Energy @ Max. Load @ 23° C. (73° F.) | D 3763 | 42 J |
| Impact Resistance (Puncture) Energy @ Max. Load @ 23° C. (73° F.) | D 3763 | 31 ft.lb$_f$ |
| Impact Resistance (Puncture) Energy @ Max. Load @ −40° C. (−40° F.) | D 3763 | 52 J |

TABLE 4-continued

Mechanical Properties of EASTAR ® PCTG 5445 Copolyester
(Injection Molded Specimens)

| Properties[a] | ASTM Method | Value |
|---|---|---|
| Impact Resistance (Puncture) Energy @ Max. Load @ −40° C. (−40° F.) | D 3763 | 38 ft.lb$_f$ |

[a]Unless noted otherwise, all tests were run @ 23° C. (73° F.) and 50% relative humidity.
[b]Nonbreak as defined by ASTM D 256 using 854 J/m (16 ft.lbf/in.) capacity pendulum with 32 mm (⅛ in.) specimens.
[c]Nonbreak as defined by ASTM D 4812 using 4,268 J/m (80 ft.lbf/in.) capacity pendulum with 3.2 mm (⅛ in.) specimens.

One suitable example of the glycol-modified copolyester of polyethylene terephthalate (also referred to herein as (1) "PETG" and/or as (2) "glycol-modified copolyester of PET") that may serve as part or all of the primary polymeric material is EASTAR® PETG 6763 copolyester. The Chemical Abstract Service (CAS) Registry Number of the EASTAR® PETG 6763 copolyester is 025640-14-6. EASTAR® PETG 6763 copolyester may be obtained from Eastman Chemical of Kingsport, Tenn. Other suitable non-exhaustive examples of the PETG include EASTAR® Copolyester K3000 and EASTAR PROVISTA® Copolymer are also available from Eastman Chemical of Kingsport, Tenn. Some possible techniques for forming PETG that may be used in preparing wireless twist ties of the present invention are provided in U.S. Pat. No. 5,656,715.

EASTAR® PETG 6763 copolyester is used as an amorphous (non-crystalline) thermoplastic polyester of the PET polyethylene terephthalate) family. The "G" in PETG indicates the use of a second glycol group in making the polymer. The addition of this second glycol group results in a copolyester that may be processed by extrusion methods.

Some film properties, mechanical properties, and thermal properties of the EASTAR® PETG 6763 copolyester are provided in Tables 5, 6, and 7 below, respectively:

TABLE 5

Film Properties of EASTAR ® PETG 6763 Copolyester

| PROPERTIES[a] | ASTM METHOD | VALUE |
|---|---|---|
| Thickness of film tested | D 374 | 250 microns (10 mils) |
| Density @ 23° C. | D 1505 | 1.27 g/cm$^3$ |
| Haze | D 1003 | 0.8% |
| Gloss @ 45° | D 2457 | 108 |
| Percent Total Transmittance | D 1003 | 85% |
| Regular Transmittance | D 1003 Modified | 89% |
| Total Transmittance | D 1003 Modified | 91% |
| Refractive Index, $N_d$ | D 542 | 1.56 |
| Elmendor Tear Strength (M.D.) | D 1922 | 1400 g |
| Elmendor Tear Strength (T.D.) | D 1922 | 1700 g |
| Tensile Strength @ Yield (M.D.) | D 882 | 52 MPa (7,500 psi) |
| Tensile Strength @ Yield (T.D.) | D 882 | 52 MPa (7,500 psi) |
| Tensile Strength @ Break (M.D.) | D 882 | 59 MPa (8,600 psi) |
| Tensile Strength @ Break (T.D.) | D 882 | 55 MPa (8,000 psi) |
| Elongation @ Yield (M.D.) | D 882 | 4% |
| Elongation @ Yield (T.D.) | D 882 | 4% |
| Elongation @ Break (M.D.) | D 882 | 400% |
| Elongation @ Break (T.D.) | D 882 | 400% |
| Tensile Modulus (M.D.) | D 882 | 1,900 MPa (2.8 x 10$^5$ psi) |
| Tensile Modulus (T.D.) | D 882 | 1,900 MPa (2.8 x 10$^5$ psi) |
| Coefficient of Friction, Film-to-Film | D 1894 | 0.5 |
| Water Vapor Transmission Rate[b] | F 372 | 7 g/m$^2$.24h |
| Water Vapor Transmission Rate[b] | F 372 | 0.5 g/100 in.$^2$.24h |
| Gas Permeability (CO$_2$) | D 1434 | 49 cm$^3$.mm/m$^2$.24h.atm |
| Gas Permeability (CO$_2$) | D 1434 | 125 cm$^3$.mil/100 in.$^2$.24.atm |
| Gas Permeability (O$_2$) | D 3985 | 10 cm$^3$.mm/m$^2$.24h.atm |
| Gas Permeability (O$_2$) | D 3985 | 25 cm$^3$.mil/100 in.$^2$.24.atm |
| Dart Impact[c] @ 23° C. (73° F.) | D 1709A Modified | 400 g |
| Dart Impact[c] @ −18° C. (0° F.) | D 1709A Modified | 500 g |
| Inherent Viscosity (film)[d] | EMN-A-AC-G-V-1 | 0.70 |
| Water Vapor Transmission Rate[c] | F 372 | 6 g/m$^2$.24h (0.4 g/100 in.$^2$.24h) |

[a]Unless noted otherwise, all tests were run @ 23° C. (73° F.) and 50% relative humidity.
[b]Tests conducted @ 38° C. (100° F.) and 100% relative humidity.
[c]Test conducted using 12.7-mm (½-in.) dia. head, 127-mm (5-in.) dia. clamp, and 660-mm (26-in.) drop.
[d]The inherent viscosity of pellets is typically 0.75.

TABLE 6

Mechanical Properties of EASTAR ® PETG 6763 Copolyester
(Injection Molded Specimens)

| Properties[a] | ASTM Method | Value |
|---|---|---|
| Specific Gravity | D 792 | 1.27 |
| Tensile Stress @ Break, | D 638 | 28 MPa (4,100 psi) |
| Tensile Stress @ Yield | D 638 | 50 MPa (7,300 psi) |
| Elongation @ Break | D 638 | 130% |
| Tensile Modulus | D 638 | 2,100 MPa (3.0 x $10^5$ psi) |
| Flexural Modulus | D 790 | 2,100 MPa (3.0 x $10^5$ psi) |
| Flexural Strength @ Yield | D 790 | 70 MPa (10,200 psi) |
| Rockwell Hardness, R Scale | D 785 | 106 |
| Impact Strength (Notched Izod) @ 23° C. (73° F.) | D 256 | 101[b] J/m |
| Impact Strength (Notched Izod) @ 23° C. (73° F.) | D 256 | 1.9[b] ft.lb$_f$/in. |
| Impact Strength (Notched Izod) @ −40° C. (−40° F.) | D 256 | 37 J/m |
| Impact Strength (Notched Izod) @ −40° C. (−40° F.) | D 256 | 0.7 ft.lb$_f$/in. |
| Impact Strength (Unnotched) @ 23° C. (73° F.) | D 4812 | NB[b] |
| Impact Strength (Unnotched) @ −20° C. (−4° F.) | D 4812 | NB[b] |
| Impact Strength (Unnotched) @ −30° C. (−22° F.) | D 4812 | NB[b] |
| Impact Strength (Unnotched) @ −40° C. (−40° F.) | D 4812 | NB[b] |
| Impact Resistance (Puncture) (2.5 mm thick plaques) Energy @ Max. Load @ 23° C. (73° F.) | D 3763 | 28 J (21 ft.lb$_f$) |
| Impact Resistance (Puncture) (2.5 mm thick plaques) Energy @ Max. Load @ 40° C. (−40° F.) | D 3763 | 41 J (30 ft.lb$^f$) |
| Impact Resistance (Puncture) (2.5 mm thick plaques) Energy @ Max. Load @ 23° C. (73° F.) | D 3763 | 33 J (24 ft.lb$^f$) |
| Impact Resistance (Puncture) (2.5 mm thick plaques) Energy @ Max. Load @−40° C. (−40° F.) | D 3763 | 50 J (30 ft.lb$^f$) |
| Water Absorption, 24 hour immersion | D 570 | 0.13% |

[a]Unless noted otherwise all tests were run @ 23° C. (73° F.) and 50% relative humidity.
[b]Nonbreak as defined by ASTM D 4812 using 4,268 J/m (80 ft.lbf/in) capacity pendulum with 3.2 mm (⅛ in.) specimens.

TABLE 7

Thermal Properties of EASTAR ® PETG 6763 Copolyester

| PROPERTIES, UNITS | ASTM METHOD | VALUE |
|---|---|---|
| Deflection Temperature @ 0.455 MPa (66 psi) | D 648 | 70° C. (158° F.) |
| Deflection Temperature @ 1.82 MPa (264 psi) | D 648 | 64° C. (147° F.) |
| Vicat Softening Point ° F. | D 1525 | 85° C. (185° F.) |
| Thermal Conductivity | C 177 | 0.21 W/m.K (1.5 Btu.in/h.ft$^2$.° F.) |
| Glass Transition Temperature | D 3418 | 80° C. (176° F.) |
| Specific Heat @ 60° C. (140° F.) | DSC | 1.30 kJ/kg.K (0.31 cal/g.° C.) |
| Specific Heat @ 100° C. (212° F.) | DSC | 1.76 kJ/kg.K (0.42 cal/g.° C.) |
| Specific Heat @ 150° C. (302° F.) | DSC | 1.88 kJ/kg.K (0.45 cal/g.° C.) |
| Specific Heat @ 200° C. (284° F.) | DSC | 1.97 kJ/kg.K (0.47 cal/g.° C.) |
| Specific Heat @ 250° C. (356° F.) | DSC | 2.05 kJ/kg.K (0.49 cal/g.° C.) |
| Coefficient of Linear Thermal Expansion | D 696 | 5.1 X $10^{-5}$ mm/mm.° C. (−30° C. to +40° C.) |

[a]Test run @ 23° C. (73° F.).

The acid-modified copolyester of polycyclohexylene dimethylene terephthalate (also referred to herein as (1) "PCTA" and/or as (2) "acid-modified copolyester of PCT" and/or as (3) "copolyester of CHDM (cyclohexane-dimethanol) and PTA (purified terephthalic acid)) that may serve as part or all of the primary polymeric material may, as one example, be acid-modified poly(1,4 cyclohexylene dimethylene terephthalate). One suitable example of the PCTA is DURASTAR® DS2000 PCTA copolyester. The Chemical Abstract Service (CAS) Registry Number of the DURASTAR® DS2000 PCTA copolyester is 036487-02-2. DURASTAR® DS2000 PCTA copolyester may be obtained from Eastman Chemical of Kingsport, Tenn. Other suitable non-exhaustive examples of the PCTA include DURASTAR® DS1000 PCTA copolyester and DURASTAR® DS1010 PCTA copolyester that are also available from Eastman Chemical of Kingsport, Tenn. Acid-modified poly, (14 cyclohexylene dimethylene terephthalate) generally has the structure that is provided in Formula II below:

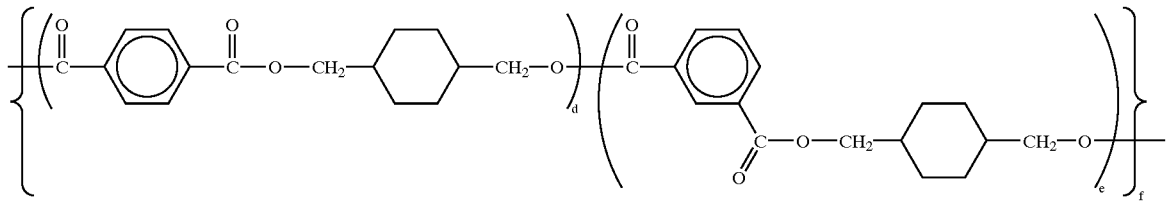

where d, e, and f are arbitrary numbers that merely indicate the random order of the d, e, and f segments in the PCTA, but do not say anything about the amount of the d segments relative to the amount of the e segments in the PCTA. Any amount of the d segments relative to the amount of the e segments in the PCTA may be used so long as the primary polymeric material is capable of being melted and extruded to form wireless twist ties in accordance with the present invention.

DURASTAR® DS2000 PCTA copolyester is used as an amorphous (non-crystalline) thermoplastic polyester of the PCT (polycyclohexylene dimethylene terephthalate) family. The "A" in PCTA indicates the use of a second acid group in making the polymer. The addition of this second acid group results in a copolyester that may be processed by extrusion methods.

Some mechanical properties, thermal properties, and optical properties of the DURASTAR® DS2000 PCTA copolyester are provided in Tables 8 and 9 below, respectively:

TABLE 8

Mechanical Properties of DURA STAR ® DS2000 PCTA Copolyester
(Injection Molded Specimens)

| Properties | ASTM Method | Value |
|---|---|---|
| Specific Gravity | D 792 | 1.2 |
| Tensile Stress @ Break, | D 638 | 53 MPa (7,700 psi) |
| Tensile Stress @ Yield | D 638 | 46 MPa (6,700 psi) |
| Elongation @ Break | D 638 | 310% |
| Elongation @ Yield | D 638 | 5% |
| Flexural Modulus | D 790 | 1,900 MPa (2.75 x $10^5$ psi) |
| Flexural Strength @ Yield | D 790 | 67 MPa (9,700 psi) |
| Rockwell Hardness, R Scale | D 785 | 105 |
| Impact Strength (Notched Izod) @ 23° C. (73° F.) | D 256 | 370 J/m (7 ft.lb$_f$/in.) |
| Impact Strength (Notched Izod) @ −40° C. (−40° F.) | D 256 | 60 J/m (1.1 ft.lb$_f$/in.) |
| Impact Strength (Unnotched) @ 23° C. (73° F.) | D 4812 | NB$^b$ |
| Impact Strength (Unnotched) @ −40° C. (−40° F.) | D 4812 | NB$^b$ |
| Impact Resistance (Puncture) Energy @ Max. Load @ 23° C. (73° F.) | D 3763 | 45 J (33 ft.lb$_f$) |
| Impact Resistance (Puncture) Energy @ Max. Load @ −40° C. (−40° F.) | D 3763 | 48 J (35 ft.lb$_f$) |

$^a$Unless noted otherwise, all tests were run @ 23° C. (73° F.) and 50% relative humidity
$^c$Nonbreak as defined by ASTM D 4812 using 4.268 J/m (80 ft.lbf/in.) capacity pendulum with 32 mm (⅛ in.) specimens.

TABLE 9

Thermal and Optical Properties of DURASTAR ® DS2000 PCTA Copolyester

| PROPERTIES, UNITS | ASTM METHOD | VALUE |
|---|---|---|
| Deflection Temperature @ 0.455 MPa (66 psi) | D 648 | 73° C. (164° F.) |
| Deflection Temperature @ 1.82 MPa (264 psi) | D 648 | 65° C. (149° F.) |
| Haze | D 1003 | 0.3% |

TABLE 9-continued

Thermal and Optical Properties of DURASTAR ® DS2000 PCTA Copolyester

| PROPERTIES, UNITS | ASTM METHOD | VALUE |
|---|---|---|
| Percent Total Transmittance | D 1003 | 9 |
| Regular Transmittance | D 1003 Modified | 89% |

The primary polymeric material, such as the PCTG, the PETG, and/or the PCTA, may be incorporated in the wireless twist tie at any concentration that is effective to produce the wireless twist tie. Thus, in one preferred form, the wireless twist tie of the present invention may include PCTG, PETG, or PCTA at any concentration ranging from about 1 weight percent PCTG to about 100 weight percent PCTG, from about 1 weight percent PETG to about 100 weight percent PETG, or from about 1 weight percent PCTA to about 100 weight percent PCTA, based upon the total weight of the wireless twist tie. Alternatively, the primary polymeric material may include multiple components, such as two or more of PCTG, PETG, and PCTA, where the collective concentration of the multiple components, such as PCTG, PETG, and/or PCTA ranges from about 1 weight percent primary polymeric material to about 100 weight percent primary polymeric material, based on the total weight of the wireless twist tie. In a preferred embodiment of the wireless twist tie, the concentration of the primary polymeric material, as PCTG only, ranges from about 55 weight percent PCTG to about 100 weight percent PCTG, based on the total weight of the wireless twist tie.

Besides the primary polymeric material, such as the PCTG, the PETG, and/or the PCTA, the wireless twist tie of the present invention may optionally incorporate a number of additional components. For example, the wireless twist ties may optionally include a secondary polymeric material, such as any thermoplastic polymer(s) and/or any thermoplastic copolymer(s), so long as the primary polymeric material and the secondary polymeric material are compatible with each other. As used herein, unless otherwise indicated, the term "compatible" means capable of forming a homogeneous mixture of components that neither separates nor is degraded by chemical interaction between the components, such as the primary polymeric material and the secondary polymeric material. Consequently, in view of this compatibility requirement, the primary polymeric material and the secondary polymeric material, should be capable of forming a homogeneous mixture with a uniform composition and should also be capable of remaining homogeneously mixed during and after formation into wireless twist ties. Therefore, homogeneous mixtures of the primary polymeric material and the secondary polymeric material should also be capable of extrusion to form wireless twist ties.

Though the secondary polymeric material(s) may generally have any, melt flow index that permits formation of the inventive wireless twist tie, the secondary polymeric material preferably has a melt flow index of about 20 grams/10 minutes, or less, as determined by ASTM Standard Number D1238-99 that is entitled *Standard Test Method for Flow Rates of Thermoplastics by Extrusion Plastometer*. A copy of ASTM Standard Number D1238-99 may be obtained from the American Society for Testing and Materials of West Conshohocken, Pa.

Some non-exhaustive examples of suitable thermoplastic copolymers for the secondary polymeric material that may be optionally combined with the primary polymeric material in the wireless twist tie of the present invention include a variety of different ethylene-based copolymers, such as (1) ethylene vinyl acetate (also referred to herein as "EVA"), (2) ethylene acrylic acid (also referred to herein as "EAA"), (3) ethylene ethyl acrylate (also referred to herein as "EEA"), and (4) ethylene methyl acrylate (also referred to herein as "EMA"). Thus, the ethylene-based copolymer(s) may, as some non-exhaustive examples, include an acetate group ($CH_3COO-$), an acidic carboxyl group ($COOH-$), and/or a $C_3H_3O_2-$ radical. The secondary polymeric material, may incorporate one or more polymers and/or copolymers, such as the EVA, the EAA, the EEA, and/or the EMA. Any polymer(s) and/or copolymer(s), such as the EVA, the EAA, the EEA, and/or the EMA, may be incorporated in the secondary polymeric material at any weight ratio relative to any other polymer(s) and/or copolymer(s) that is(are) included in the secondary polymeric material.

The secondary polymeric material, such as the EVA, the EAA, the EEA, and/or the EMA, may be incorporated in the wireless twist tie at any concentration that is effective to produce the wireless twist tie. Thus, in one preferred form, the wireless twist tie of the present invention may include EVA, EAA, EEA, or EMA at any concentration ranging from about 0.5 weight percent EVA to about 60 weight percent EVA, from about 0.5 weight percent EAA to about 60 weight percent EAA, from about 0.5 weight percent EEA to about 60 weight percent EEA, or from about 0.5 weight percent EMA to about 60 weight percent EMA, based upon the total weight of the wireless twist tie. Alternatively, the secondary polymeric material may include multiple components, such as two or more of EVA, EAA, EEA, and/or EMA, where the collective concentration of the multiple components, such as EVA, EAA, EEA, and/or EMA, ranges from about 0.5 weight percent secondary polymeric material to about 60 weight percent secondary polymeric material, based on the total weight of the wireless twist tie. In a preferred embodiment of the wireless twist tie, the concentration of the secondary polymeric material, as EVA only, ranges from about 0.5 weight percent EVA to about 60weight percent EVA, based on the total weight of the wireless twist tie. In a more preferred embodiment of the wireless twist tie, the concentration of the secondary polymeric material, as EVA only, ranges from about 5 weight percent EVA to about 40 weight percent EVA, based on the total weight of the wireless twist tie.

One suitable example of the EVA is ULTRATHENE® UE 630-000 EVA that is available from Equistar Chemicals, LP, of Houston, Tex. The Chemical Abstract Service (CAS) Registry Number of the ULTRATHENE® UE 630-000 EVA is 024937-78-8. ULTRATHENE® UE 630-000 EVA is an EVA copolymer that incorporates about 17 weight percent vinyl acetate, based upon the total weight of the EVA copolymer. Nonetheless, it is believed that the EVA may incorporate up to about 25 weight percent vinyl acetate, based upon the total weight of the EVA copolymer, while still permitting the wireless twist tie to achieve beneficial results in accordance with the present invention. Some physical, mechanical, and thermal properties of the ULTRATHENE® UE 630-000 EVA are provided in Table 10 below:

TABLE 10

Some Properties of ULTRATHENE ® UE 630-000 EVA

| Property | Value | ASTM Test Method |
| --- | --- | --- |
| Melt Index[a] | 1.8 g/10 min | D 1238 |
| Vinyl Acetate Incorporated | 17% | |
| Tensile Strength @ Break[b] | 2,100 psi | D 638 |
| Elongation @ Break[b] | 730% | D 638 |
| Flexural Modulus, 1% Secant | 6,800 psi | D 638 |
| Dart Drop Impact Strength, $F_{50}$ | >325 g | D 1709 |
| Low Temperature Brittleness | −105° C. | D 746 |
| Vicat Softening Point | 153° C. | D 1525 |
| Hardness, Shore A | 90 | D 2240 |

[a]The melt index figures are equivalent values correlated from the Melt Flow Rates obtained with ASTM D 1238.
[b]Crosshead speed for Tensile Strength and Elongation at 20°/min. Type IV specimen.

Besides the primary polymeric material, such as the PCTG, the PETG, and/or the PCTA and the optional secondary polymeric material, such as the EVA, the EAA, the EEA, and/or the EMA, the wireless twist tie may optionally also incorporate any additive(s), such as internal plasticizer (s), external plasticizers, compounding agent(s), colorant(s) (such as dye(s) and/or pigment(s)), viscosity modifier(s), impact modifier(s), filler(s), inhibitor(s), and/or thermal stabilizer agent(s), at any concentration that is effective to carry out the function of the additive(s), as long as any incorporated additive(s) is(are) compatible with, and are capable of being homogeneously mixed with, the primary polymeric material and any of the optionally included secondary polymeric material.

For example, the wireless twist tie may incorporate a color concentrate. The color concentrate may, as non-exhaustive examples, incorporate any suitable resinous material, such as polyethylene or polycarbonate, as a carrier along with the colorant, such as a dye or pigment. Some non-exhaustive examples of suitable color concentrates include the No. 15250 (red), the No. 17604 (green), the No. 160520 (blue), the No. 18109 (Brown) and the No. 11078 (yellow) color concentrates that are each available from Ampacet Corporation of Tarrytown, N.Y. The Ampacet No. 11078 color concentrate is white in color and incorporates polyethylene as the carrier resin. Another example of a suitable color concentrate is PCR white 10001045 color concentrate, which is also white in color but instead incorporates polycarbonate as the carrier resin. The PCR white 10001045 color concentrate is available from the ReedSpectrum division of Clariant Corporation of Holden, Mass. Another example of a suitable color concentrate is the No. 00043438 (orange) color concentrate that is also available from the ReedSpectrum division of Clariant Corporation of Holden, Mass.

Though the twist tie of the present invention is described primarily in terms of being wireless, it is acceptable, though not preferred, to incorporate a metal wire in the twist tie, especially in those applications of the twist tie where the presence of the metal wire will not create problems. Some examples of suitable applications for the twist tie that may optionally incorporate metal wire are those where packages that are closed with the twist tie will not be subjected to microwave radiation and will not be subjected to metal detection. The system and technique for forming the twist ties of the present invention are generally described below in a form that does not incorporate any metal wire. Nonetheless, those of ordinary skill in the art of twist tie manufacture will readily recognize that modifications to the system and method for manufacturing twist ties that are described herein may be readily made to incorporate metal wire in the twist tie using the ordinary skill of those in the art of twist tie manufacturing. Also, though the twist tie of the present invention is generally described as being free of metal, the twist tie may optionally include either metal, generally, such as metal wire as discussed above or metal flake, or may be manufactured to incorporate only non-magnetic metal, such as aluminum, especially in those applications where the presence of metal or the presence of non-magnetic metal will not create difficulties during use of the twist tie.

A system for manufacturing the wireless twist ties of the present invention is generally depicted at 10 in FIG. 1. The system 10 includes an extruder 12. One example of a suitable extruder is a Killion extruder with a barrel length to barrel diameter (L/D) ratio of 24:1, a barrel diameter of about 2.5 inches, a single screw with a diameter of about 2.5 inches, and three barrel heating zones. Such a Killion extruder may be obtained from Killion Extruders, Inc. of Cedar Grove, N.J. Killion Extruders, Inc. is a subsidiary of Davis-Standard Corporation of Pawcatuck, Conn.

To ensure that the components used in the wireless twist tie are homogeneously mixed, a motionless mixer 14, which may also be characterized as a static mixer, may be attached to the outlet of the extruder 12. An example of a preferred motionless mixer is the ISG motionless mixer that is available from Ross Engineering of Hauppauge, N.Y. An adaptor block 16 is attached to the mixer 14, and a die block 18 is attached to the adaptor block 16. One purpose of the adaptor block 16 is to provide an adaptive mechanism for attaching the die block 18 to the mixer 14.

The system 10 additionally includes a bath assembly 20. The bath assembly 20 includes a bath 22 and rollers 24, 26. The rollers 24, 26 are attached to the bath assembly 20 such that the rollers 24, 26 are submerged when the bath 22 is filled with a cooling fluid. One example of a suitable cooling fluid is water. A pull roll assembly 28 is attached to the bath assembly 20 outside of the bath 22 and downstream of the rollers 24, 26. Another roller 30 is also attached to the bath assembly 20 downstream of the pull roll assembly 28. Finally, the system 10 includes a conventional spooler 32.

Briefly, as an overview of the system 10, a mixture of the components that will be used to form the wireless twist tie is prepared and placed into a feed hopper (not shown) of the extruder 12. The mixture of components is then processed through the extruder 12 and may thereafter pass through the optional mixer 14 to ensure homogeneous mixture of the components. After passing through the optional mixture 14, the mixture of components is extruded at the die block 18 to form a ribbon 34 of the inventive twist tie. The point where the ribbon 34 exits the die block 18 is spaced a select distance A from an upper surface 35 of the cooling fluid in the bath 22. The distance A may be varied to modify the drawn properties of the ribbon 34. The temperature of the cooling fluid in the bath 22 may also be selected to vary properties of wireless twist ties produced using the system 10. The pull roll assembly 28, via the rollers 24, 26, applies a select amount of tension to the ribbon 34 as the ribbon 34 exits the die block 18 and prior to immersion of the ribbon 34 in the cooling fluid of the bath 22. This application of tension to the ribbon 34 gives the ribbon 34, upon cooling and consequent quenching of the ribbon 34 in the bath 22, a select amount of "draw down". After being drawn down, the ribbon 34 passes the pull roll assembly 28 and the roller 30 and is wound onto the spooler 32.

Manufacture of the wireless twist tie of the present invention using the system 10 proceeds after first preparing the various components that will be used to fabricate the wireless twist tie. The various components that will be used to fabricate the wireless twist tie, such as the primary polymeric material, the optional secondary polymeric material, and the optional additive(s), are pre-blended together to form a wireless twist tie component mixture. The concentration of the components in the wireless twist tie component mixture, after drying of the mixture, will typically be the same, or essentially the same, as the concentration of these components in the wireless twist tie.

The components of the wireless twist tie component mixture are preferably dry-blended together to reduce the overall moisture content of the wireless twist tie component mixture and to ensure that the various components of the wireless twist tie component mixture are homogeneously combined. It is desirable to minimize the overall moisture content of the wireless twist tie component mixture since some polymeric materials contemplated for incorporation in the wireless twist ties are susceptible to hydrolysis reactions at the elevated temperatures present during the extrusion process if the overall moisture content of the wireless twist tie component mixture is not reduced below a predetermined level, such as about 0.08 weight percent, based upon the total weight of the twist tie component mixture. Preferably, the overall moisture content of the wireless twist tie component mixture is reduced below about 0.03 weight percent, and more preferably below about 0.02 weight percent, based upon the total weight of the twist tie component mixture, to further minimize the potential for, and extent of, any hydrolysis reactions.

The wireless twist tie component mixture may be dried using any known, conventional polymer component drying system, such as a desiccant bed-type system of the type that is well-known in the polymer processing industry. After the wireless twist tie component mixture has been dried, nitrogen may be passed through the wireless twist tie component mixture to purge and further dry the wireless twist tie component mixture. Also, a nitrogen blanket may be, and preferably is, maintained on the dried wireless twist tie component mixture prior to introduction of the dried wireless twist tie component mixture into the feed hopper (not shown) of the extruder 12.

In preparation for extrusion, the dried wireless twist tie component mixture is placed into the feed hopper (not shown) of the extruder 12. While it may be beneficial to maintain a nitrogen blanket on the dried wireless twist tie component mixture after placement of the dried wireless twist tie component mixture in the feed hopper of the extruder 12, it has been found that the wireless twist ties of the present invention may typically be fabricated with acceptable properties without maintaining such a nitrogen blanket on the feed hopper. Nevertheless, if such a feed hopper nitrogen purge is desired, a nitrogen stream may be introduced either at the bottom or the top of the feed hopper.

The selection of an appropriate extruder for extruding the dried wireless twist tie component mixture is within the knowledge of those of ordinary skill in the art of polymer extrusion. In one preferred form, the extruder 12 has a barrel length to barrel diameter (L/D) ratio of 24:1, a barrel diameter of about 2.5 inches, a single screw with a diameter of about 2.5 inches, and three barrel heating zones. When extruding polymeric materials, there are several interrelated variables of interest, such as the viscosity of the polymeric materials, the temperature maintained within the heat zones of the extruder, the speed of rotation of the screw within the extruder, and the size and geometry of the die opening. One common approach to characterizing conditions that will produce successful extrusion by a particular system is to rely on the melt flow temperature of the material being extruded. The term "melt flow temperature" means the approximate temperature range of the material as the material passes through the extruder. This melt flow temperature takes into account the various interrelated variables listed above.

The above-noted Killion extruder that may be used as the extruder 12 in the system 10 has three distinct extruder barrel heat zones (also referred to herein as heat zones 1–3) along with a flange heat zone (also referred to herein as heat zone 4), an optional mixing section heat zone (also referred to herein as heat zone 5) where the optional motionless mixer 14 may be positioned, and a die heat zone (also referred to herein as heat zone 6). The temperatures in heat zones 1–6 are preferably set to maintain the melt flow temperature of the dried wireless twist tie component mixture between about 450° F. and about 550° F., and preferably between about 490° F. and about 520° F., while the dried wireless twist tie component mixture is passing through the extruder 12 and prior to formation of the dried wireless twist tie component mixture into the ribbon 34 of wireless twist tie.

Those of ordinary skill in the art of polymer extrusion are capable of selecting the extruder barrel heat zone temperatures, the flange heat zone temperature, the mixture section heat zone temperature, and the die heat zone temperature necessary for maintaining the melt flow temperature of the dried wireless twist tie component mixture between about 450° F. and about 550° F. Generally, to maintain the melt flow temperature of the dried wireless twist tie component mixture between about 450° F. and about 550° F., the heat zone 1 temperature may be maintained between about 450° F. and about 550° F., the heat zone 2 temperature may be maintained between about 480° F. and about 550° F., and the temperatures in heat zones 3, 4, 5, and 6 may be maintained between about 440° F. and about 515° F.

The temperature ranges recited above for heat zones 1–6 have been found to be generally adequate for maintaining the gauge pressure within the extruder 12, when the extruder 12 is the above-noted Killion extruder, within a range extending from about 100 psi to about 2,000 psi, where "psi" means "pounds per square inch" and where the pressure is measured between the discharge end (not shown) of the extruder 12 screw and the adaptor block 16. Beneficially, when PCTG is used as the primary polymeric material and EVA is used as the secondary polymeric material, the gauge pressure tends to decrease somewhat as the ratio of EVA to PCTG increases. Such decreases in the extruder 12 gauge pressure are preferred since such decreases in pressure reduce the operational strain on the extruder 12 and associated equipment and consequently reduce maintenance expenses for the extruder 12 and associated equipment.

Generally, the speed of the screw (not shown) in the extruder 12, when the extruder 12 is the above-noted Killion extruder, has been observed to range from about 14 RPM to about 20 RPM, where "RPM" refers to revolutions per minute, when single strands of the inventive wireless twist tie are produced at a strand haul off (take-up) rate from the Killion extruder of about 500 feet per minute. However, the screw speed of the Killion extruder may range above about 20 RPM when multiple, parallel strands of the inventive wireless twist tie are extruded in sheet form, and thereafter separated from each other as individual ribbons 34, when multiple, parallel strands of the inventive wireless twist tie are extruded simultaneously as individual ribbons 34, or when the strand haul off rate from the Killion extruder exceeds about 500 feet per minute while producing a single strand of the inventive wireless twist tie.

The selection of an appropriate screw speed for a particular extruder, such as the above-noted Killion extruder or an extruder other than the above-noted Killion extruder, is within the knowledge of those of ordinary skill in the art of polymer extrusion. Furthermore, those of ordinary skill in the art of polymer extrusion will recognize that adjustment of the screw speed ranges provided above for the Killion extruder may sometimes be appropriate, and will be capable of determining appropriate adjustments, for various combinations of particular dried wireless twist tie component compositions and production parameters of the inventive wireless twist tie.

After processing in the extruder 12 and the mixer 14, the dried wireless twist tie component mixture is forced through a die opening (not shown) of the die block 18. Preferably, the dried wireless twist tie component mixture is extruded through the die opening of the die block 18 at an angle of approximately 90° with respect to the longitudinal axis of the extruder 12 screw to facilitate feeding of the ribbon 34 of the wireless twist tie into the bath 22. Selection of sizes and shapes of the die opening of the die block 18 to produce wireless twist ties with particular sizes and shapes are within the knowledge of one of ordinary skill in the art of polymer extrusion. Consequently, those of ordinary skill in the art of polymer extrusion will, based upon the desired shape and dimensions of the ribbon 34 of the wireless twist tie as the ribbon 34 of the wireless twist tie is wound onto the spooler 32, be capable of selecting an appropriate size and shape of the die opening of the die block 18.

An important aspect of the present invention is the pre-solidification draw down ratio that is imparted to the ribbon 34 as the ribbon 34 moves from the die block 18 to the upper surface 35 of the cooling fluid of the bath 22. The term "pre-solidification draw down" means the ratio of (a) the cross sectional (profile) area of the wireless twist tie (ribbon 34) at the point where the ribbon 34 exits the die block 18 to (b) the profile (cross sectional) area of the wireless twist tie (ribbon 34) after the ribbon 34 cools and fully solidifies and is no longer molten to any degree.

The pre-solidification draw down causes axial orientation of the polymer components in the wireless twist tie. This axial orientation enhances the tensile strength and the yield strength of the wireless twist tie. The amount of pre-solidification draw down is determined by a number of different factors such as the (1) the rate at which the wireless twist tie component mixture is extruded through the die block 18, (2) the viscosity of the extruded material, and the (3) speed at which the rollers of the pull roll assembly 28 are moving. Consequently, due to the dependence of the pre-solidification draw down ratio on the speed of the rollers of the pull roll assembly 28, the pre-solidification draw down ratio is also dependent upon the tension applied by the pull roll assembly 28 to the ribbon 34 as the ribbon 34 exits the die block 18 and prior to solidification of the ribbon 34. The pre-solidification draw down ratio of the wireless twist tie (ribbon 34) that is imparted during manufacture of the wireless twist tie in the system 10, and prior to solidification of the ribbon 33, may generally range from about 3:1 to about 20:1, though the pre-solidification draw down ratio preferably ranges from about 7.5:1 to about 14:1 to optimize the beneficial properties of the inventive twist tie.

The distance A between the die opening of the die block 18 and the upper surface 35 of the cooling fluid in the bath 22 may generally be any distance that is effective to effectuate the desired pre-solidification draw down ratio. As an example, setting distance A to range from about 2 inches to about 6½ inches, depending upon other variables that affect the pre-solidification draw down ratio, has been found suitable for effecting the pre-solidification draw down ratio that ranges from about 3:1 to about 20:1. Of course, the distance A may be outside of this range so long as the distance A permits achievement of the desired pre-solidification draw down ratio.

The size of the bath 22 should be selected, based upon the rate at which the ribbon 34 of the wireless twist tie exits the die opening of the die block 18, such that the ribbon 34 of the wireless twist tie remains submerged within the cooling fluid of the bath 22 for a time sufficient to cool the ribbon 34 of the wireless twist tie to the desired degree and consequently fully solidify polymeric components of the ribbon 34. Preferably, the bath 22 has a length B between the rollers 24, 26 of about eight feet when the cooling fluid is water. Also, water in the bath 22 is preferably maintained at a temperature ranging between about 6° C. and about 27° C.

Sufficient cooling of the ribbon 34 of the wireless twist tie in the bath 22 is required to prevent distortion of the ribbon 34 of the wireless twist tie as the ribbon 34 passes onto and/or through pull rolls, such as the roller 30 and the spooler 32, located downstream of the bath 22. Sufficient cooling of the ribbon 34 of the wireless twist tie in the bath 22 is also required to prevent the ribbon 34 of the wireless twist tie from exhibiting a memory.

The term "memory" refers to the tendency for the ribbon 34 of the wireless twist tie to retain a shape. If the ribbon 34 of the wireless twist tie is insufficiently cooled, the ribbon 34 of the wireless twist tie, after being wrapped onto the spooler 32, will possess a memory that will cause the ribbon 34 of the wireless twist tie to retain a curved shape after the ribbon 34 of the wireless twist tie is removed from the spooler 32. However, by adequately cooling the ribbon 34 of the wireless twist tie in the bath 22 prior to winding the ribbon 34 of the wireless twist tie onto the spooler 32, the ribbon 34 of the wireless twist tie will return to a substantially linear shape, and will therefore exhibit minimal, if any, memory, after unwinding the ribbon 34 of the wireless twist tie from the spooler 32. Consequently, cooling of the ribbon 34 of the wireless twist tie in the bath 22 is preferably sufficient to prevent the ribbon 34 of the wireless twist tie from exhibiting a significant memory, such as when the ribbon 34 of the wireless twist tie is removed from the spooler 32.

Besides drawing down the ribbon 34 of the wireless twist tie prior to cooling and solidification of the ribbon 34, it is also possible to further draw down the ribbon 34 after the ribbon 34 has been cooled and solidified in the bath 22. This additional post-solidification draw down of the ribbon 34 will further enhance the degree to which polymers are axially oriented in the ribbon 34. As opposed to the pre-solidification draw down ratio, this post-solidification draw down ration may be defined as the ratio of (1) the cross sectional (profile) area of the ribbon 34 as the ribbon 34 exits the bath 22 to the (2) cross-sectional (profile) area of the ribbon 34 after the additional post-solidification draw down has been completed. When post-solidification draw down is performed, the post-solidification draw down may range up to about 4:1, or more, and preferably is on the order of about 4:1.

After the ribbon 34 of the wireless twist tie has been produced and wound onto the spooler 32, the ribbon 34 may optionally be cut into any desired length to form wireless twist ties (not shown) of the present invention. The ribbon 34 will typically be cut to form wireless twist ties having lengths ranging from about 2 inches to about 10 inches. However, due to differing requirements of particular twist tie applications, the ribbon 34 may permissibly be cut to form wireless twist ties having any length including lengths outside of this general range of about 2 inches to about 10 inches.

Twist ties that are produced in accordance with the present invention should generally exhibit a tensile strength at yield of about 7,000 psi or more, a tensile strength at breakage of about 8,000 psi or more, and a percent elongation at breakage of about 100% or more, where the tensile strength at yield, tensile strength at break, and percent elongation at breakage are determined in accordance with ASTM Standard No. D 638-99, to support adequate performance of the inventive twist ties in automated twist tie application and tying machinery. Preferably, to support superior performance of the inventive twist ties in automated twist tie application and tying machinery, twist ties that are produced in accordance with the present invention should exhibit a tensile strength at yield of about 8,000 psi or more, a tensile strength at breakage of about 10,000 psi or more, and a percent elongation at breakage of about 300% or more.

Despite the option of cutting the ribbon 34 to form discrete lengths of wireless twist tie soon after ribbon 34 spooling, the elongate ribbon 34 of wireless twist tie produced in accordance with the present invention, as spools of the ribbon 34, is particularly suited for use with high speed automated twist tie application and tying machinery, such as the Model 2000 Twist Tyer, the Model 200 VT Vertical Servo Twist Tyer, and the Model 4800 Tyer/Conveyor that are each available from Burford Corporation of Maysville, Okla. Twist ties may readily be produced in accordance with the present invention to meet the preferred tensile strength at yield, tensile strength at breakage, the percent elongation at breakage values provided above. Twist ties that attain these preferred values will ordinarily meet and exceed operating requirements for twist ties that will be applied and tied to secure packaging using high speed automated twist tie application and tying machinery, such as the machinery examples listed above from Burford Corporation and other examples that are available in the marketplace.

Indeed, twist ties that meet the preferred tensile strength at yield, tensile strength at breakage, the percent elongation at breakage values provided above, will rarely if ever break or otherwise be damaged during application and tying by high speed automated twist tie application and tying machinery. Besides automated twist tie application and tying machinery, spools of the elongate ribbon 34 of wireless twist tie produced in accordance with the present invention are also well suited for use with hand-fed twist tie application and tying machinery; such as the Mini 100 Twist, the Mini 140 Twist, and the Mini 160 Twist packaging systems that are each available from Comiz SRL (a division of Cable Prep (formerly: Crimptech National Ltd.) of Copt Hewick; Ripon; North Yorkshire; United Kingdom.

Figure 2:
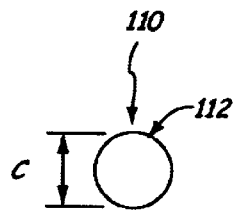
FIG. 2 is a cross-sectional view of a wireless twist tie of the present invention.

The die opening of the die block 18 may have any configuration (geometric shape and dimensions) that is effective for producing the ribbon 34 of the wireless twist tie with a desired configuration of shape and size. In one preferred embodiment, the die opening of the die block 18 is configured to produce the ribbon 34 with the cross sectional shape of a wireless twist tie 110, as best depicted in FIG. 2. The wireless twist tie 110 has a single longitudinal rib 112. The rib 112, may have any cross-sectional shape, such as the circular cross-sectional shape depicted in FIG. 2, or any other cross-sectional shape (not shown), such as a triangular, elliptical, or rectangular cross-sectional shape. In the twist tie 110, the rib 112 with the circular cross-sectional shape, preferably has a diameter C ranging from about 0.02 inches to about 0.125 inches.

Figure 3:
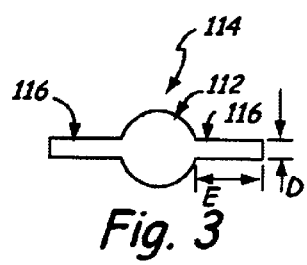
FIG. 3 is a cross-sectional view of another wireless twist tie of the present invention.

Alternatively, another preferred form of the ribbon 34 has the cross-sectional shape of a twist tie 114, as best depicted in FIG. 3. The twist tie 114, includes the rib 112. Additionally, the twist tie 114 has a pair of outwardly extending wings 116 that extend from opposite sides of the rib 112. The wings 116 are each formed integrally with the rib 112 in the tie 114. Each of the wings 116 preferably has a thickness D ranging from about 0.001 inches to about 0.025 inches and a width E ranging from about 0.01 inches to about 0.24 inches.

Figure 4:
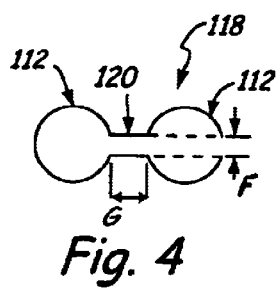
FIG. 4 is a cross-sectional view of another wireless twist tie of the present invention.

As yet another preferred embodiment, the ribbon 34 may have the cross-sectional shape of a wireless twist tie 118, as best depicted in FIG. 4. The wireless twist tie 118 has a pair of the ribs 112 and additionally includes an internal wing 120 that connects the pair of ribs 112. The internal wing 120 may have a thickness F ranging from about 0.001 inches to about 0.025 inches and may have a width G ranging from about 0.01 inches to about 0.48 inches. The twist tie 118 does not include any of the wings 116.

Figure 5:
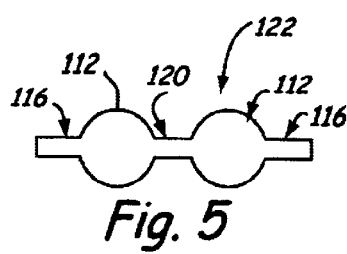
FIG. 5 is a cross-sectional view of another wireless twist tie of the present invention.
Figure 6:
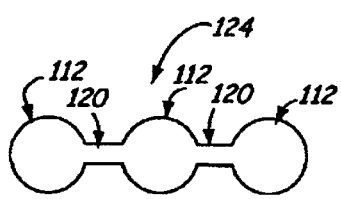
FIG. 6 is a cross-sectional view of another wireless twist tie of the present invention.

As yet another alternative, the ribbon 34 may have the cross-sectional shape of a twist tie 122, as best depicted in FIG. 5. The twist tie 122 includes a pair of the ribs 112 that are interconnected by the internal wing 120. In addition, the twist tie 122 includes a pair of the wings 116 that are integral with and extend outwardly from opposing outer surfaces of the pair of ribs 112. Next, the ribbon 34 may have the cross-sectional shape of a twist tie 124, as best depicted in FIG. 6. The twist tie 124 includes three of the ribs 112. One of the ribs 112 is centrally located between the other two ribs 112 in the wireless twist tie 124. Also, a pair of the internal wings 120 connect the central rib 112 to the outer ribs 112.

Figure 7:
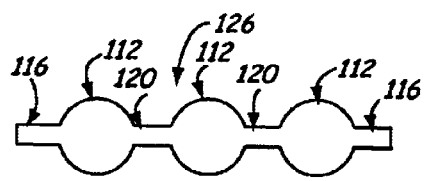
FIG. 7 is a cross-sectional view of another wireless twist tie of the present invention.
Figure 8:
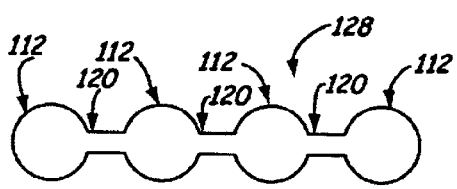
FIG. 8 is a cross-sectional view of another wireless twist tie of the present invention.

Alternatively, the ribbon 34 may have the cross-sectional shape of a twist tie 126, as best depicted in FIG. 7. The twist tie 126 is similar to the twist tie 124, with the exception that a pair of the outwardly extending wings 116 are attached to the two outer most ribs 112 of the twist tie 124. Also, the ribbon 34 may have the cross-sectional shape of a twist tie 128, as best depicted in FIG. 8. The twist tie 128 includes four of the ribs 112 that are oriented parallel and in planar relation with respect to each other. Each rib 112 is attached to any adjacent rib 112 by one of the internal wings 120.

Figure 9:
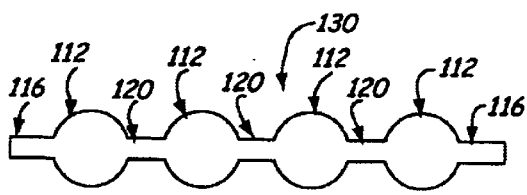
FIG. 9 is a cross-sectional view of another wireless twist tie of the present invention.

Thus, the twist tie 128 has four of the ribs 112 and three of the internal wings 120. Finally, the ribbon 34 may have the cross-sectional shape of a twist tie 130, as best depicted in FIG. 9. The twist tie 130 is similar to the twist tie 128 with the exception that the twist tie 130 includes a pair of outwardly extending wings 116 that are integral with, and extend from opposing outer surfaces of, the pair of outer most ribs 112.

The system 10 may be operated to provide the ribbon 34 with the cross-sectional shapes of the various twist ties depicted in FIGS. 2–9 as the ribbon 34 exits the die opening of the die block 18. The ribbon 34, upon exiting the die. opening of the die block 18, will typically have the crisp cross sectional shapes and dimensions within the ranges of those provided for the various twist ties depicted in FIGS. 2–9. Thereafter, depending upon a variety of processing and composition details, including, but not limited to, the degree and rate of any optional pre-solidification draw down, the degree and rate of any optional post-solidification draw down, the particular polymer(s) and/or copolymer(s) employed, any optional additive(s), and the rate of cooling, the cross sectional shape and dimensions of the ribbon 34, as accumulated on the spooler 32, may differ somewhat from the cross sectional shape and dimensions of the ribbon 34, upon exiting the die opening of the die block 18.

These processing and compositional variables may cause the cross, sectional shapes of the ribbon 34, as accumulated on the spooler 32, to become less crisp and/or slightly distorted, as compared to the cross sectional shapes depicted for the various twist ties depicted in FIGS. 2–9 and dimensions of the ribbon 34. Nonetheless, despite these processing and compositional variables the dimensional details of the ribbon 34, as accumulated on the spooler 32, will typically be within the range of the dimensional details provided above for the various twist ties depicted in FIGS. 2–9. Additionally, after accumulation on the spooler 32, aging of the ribbon 34 may sometimes cause some negligible alteration of the cross-sectional shape and dimensional details of the ribbon 34 from the cross-sectional shape and dimensional details of the ribbon 34, as originally accumulated on the spooler 32. Nonetheless, despite this aging, the dimensional details of the ribbon 34, as aged following accumulation on the spooler 32, will typically be within the range of the dimensional details provided above for the various twist ties depicted in FIGS. 2–9, and the cross-sectional shape of the ribbon 34, as aged following accumulation on the spooler 32, will be predominantly the same as the cross-sectional shape of the ribbon 34, as originally accumulated on the spooler 32.

The various twist ties depicted in FIGS. 2–9 are merely exemplary of the wireless twist ties with some conceivable cross-sectional shapes that may be prepared using the system 10 of FIG. 1. Countless other twist ties with different cross-sectional shapes, different numbers of ribs 112, different numbers and configurations of wings 116, and different numbers and configurations of wings 120 are envisioned for production in accordance with the present invention. Also, though not depicted, sheets or webs of interconnected ribbons 34 of the wireless twist ties may be extruded through the die opening of the system 10 and thereafter cut to separate individual ribbons 34 from the extruded sheet. Alternatively, several individual ribbons 34 of the wireless twist tie may be extruded simultaneously from the same die block or from different die blocks. Furthermore, though dimensions of the various twist ties depicted in FIGS. 2–9 are provided, those of ordinary skill in the art of polymer extrusion will readily recognize that the cross-sectional shapes and dimensions of these twist ties will vary to some extent, from the dimensions provided for the various twist ties of FIGS. 2–9, due to differences in operational and compositional details, including, but not limited to, the degree and rate of any optional pre-solidification draw down, the degree and rate of any optional post-solidification draw down, the particular polymer(s) and/or copolymer(s) employed, any optional additive(s), and the rate of cooling.

The wireless twist ties of the present invention consistently exhibit desirable properties while being tied, either manually or by automated or hand-fed twist tie tying equipment, and thereafter, upon untying and retying through repetitive tying and untying cycles. Generally, the wireless twist ties of the present invention may be characterized in terms of tensile strength at break, tensile strength at yield, percent elongation at yield, and/or percent elongation at break. Unless otherwise specified, all determinations and specifications of tensile strength at yield, tensile strength at break, percent elongation at yield, and percent elongation at break are to be determined in accordance with ASTM Standard No. D 638-99, entitled *Standard Test Method For Tensile Properties of Plastics*, that may be obtained; from the American Society for Testing and Materials of Conshohocken, Pa. Generally, twist ties produced in accordance with the present invention should exhibit a tensile strength at breakage of greater than about 8.000 psi and a tensile strength at yield of greater than about 7,000 psi. Preferably, the tensile strength at breakage is greater than about 10,000 psi and the tensile strength at yield of wireless twist ties produced in accordance with the present invention is greater than about 8,000 psi. The percent elongation at breakage of the wireless twist ties produced in accordance with the present invention should be greater than about 100 percent, preferably is greater than about 300 percent, and more preferably is greater than about 400 percent.

The present invention is more particularly described in the following examples that are intended as illustrations only, since numerous modifications and variations within the scope of the present invention will be apparent to those skilled in the art.

EXAMPLES

Twenty different wireless twist tie component mixtures were prepared and formed into wireless twist ties in accordance with the present invention. These wireless twist tie component mixtures have the compositions of Examples 1–25 described below in Table 11. In Table 11, all weight percentages provided are based upon the total weight of the wireless twist tie component mixture, and, consequently, in terms of the total weight of the particular wireless twist tie. The PCTG used in the wireless twist tie compositions of each of Examples 1–25 was EASTAR® PCTG 5445 Copolyester, and the EVA was ULTRATHENE® UE 630-000 EVA. Additionally, as noted in Table 11, many of the wireless twist tie component mixtures included a small amount of a color concentrate. Each of the different color concentrates mentioned in Table 11 were previously described above.

TABLE 11

| EXAMPLE NO. | WT % PCTG | WT % EVA | WT % OF COLOR CONCENTRATE | NAME OF COLOR CONCENTRATE | TWIST TIE COLOR |
|---|---|---|---|---|---|
| 1 | 100% | 0% | 0% | NONE USED | N/A |
| 2 | 100% | 0% | 0% | NONE USED | N/A |
| 3 | 99% | 0% | 1% | AMPACET 17604 | GREEN |
| 4 | 99% | 0% | 1% | AMPACET 15250 | RED |
| 5 | 99% | 0% | 1% | CLARIANT 00043438 | ORANGE |
| 6 | 99% | 0% | 1% | PCR10001045 WRITE | WHITE |
| 7 | 99% | 0% | 1% | AMPACET 11070 | YELLOW |
| 8 | 99% | 0% | 1% | AMPACET 17604 | GREEN |
| 9 | 99% | 0% | 1% | AMPACET 17604 | GREEN |
| 10 | 94% | 5% | 1% | AMPACET 15250 | RED |
| 11 | 89% | 10% | 1% | AMPACET 15250 | RED |
| 12 | 89% | 10% | 1% | AMPACET 15250 | RED |
| 13 | 84% | 15% | 1% | AMPACET 15250 | RED |
| 14 | 79% | 20% | 1% | AMPACET 15250 | RED |
| 15 | 79% | 20% | 1% | AMPACET 18109 | BROWN |
| 16 | 79% | 20% | 1% | AMPACET 15250 | RED |
| 17 | 79% | 20% | 1% | AMPACET 17604 | GREEN |
| 18 | 79% | 20% | 1% | AMPACET 160520 | BLUE |
| 19 | 79% | 20% | 1% | AMPACET 160520 | BLUE |
| 20 | 79% | 20% | 1% | AMPACET 160520 | BLUE |
| 21 | 79% | 20% | 1% | AMPACET 160520 | BLUE |
| 22 | 74% | 25% | 1% | AMPACET 15250 | RED |
| 23 | 69% | 30% | 1% | AMPACET 15250 | RED |
| 24 | 64% | 35% | 1% | AMPACET 15250 | RED |
| 25 | 59% | 40% | 1% | AMPACET 15250 | RED |

The compositions of Examples 1–25 that are described in Table 11 were each fabricated into the ribbon 34 of the wireless twist ties using a system set up like the system 10 of FIG. 1. In each of Examples 1–25, the wireless twist tie components described in Table 11 above were mixed together to form a homogeneous mixture and were thereafter dried to a moisture content of less than about 0.02 weight percent, based upon the total weight of the particular wireless twist tie component mixture, using a conventional desiccant bed-type system. After drying, the various wireless twist tie component mixtures of Examples 1–25 were placed in the feed hopper of an extruder. In Examples 1–25, the extruder was the Killion extruder previously described above with a barrel length to barrel diameter (L/D) ratio of 24:1, a barrel diameter of about 2.5 inches, a single screw with a diameter of about 2.5 inches, and three barrel heating zones.

The screw speed and the head pressure for the extruder 12 of the system 10 that was used to process the various wireless twist tie component mixtures of Examples 1–25 are provided in Table 12 below. Also, the temperatures for heat zones 1–6 that were maintained in the system 10 during extrusion of the wireless twist tie component mixtures of Examples 1–25 are provided in Table 12 below. Die configuration details for the system 10 used in Examples 1–25 are provided later in Table 13 below. However, Table 12 does provide the distance A from the die opening to the upper surface 35 of the cooling fluid (water) in the bath 22 and the temperature of the water in the bath 22 for Examples 1–25.

with the cross-sectional shape of either the wireless twist tie 110 of FIG. 2, the wireless twist tie 114 of FIG. 3, or the wireless twist tie 122 of FIG. 5, as described more fully below in Table 13. The twist ties produced in Examples 1–25 were each subjected to pre-solidification drawing in a ratio ranging from about 7.5:1 to about 14:1. The twist ties produced in Examples 1–25 were not subjected to any post-solidification draw down. The rib diameter, wing thickness, and overall tie width dimensions provided in Table 13 below were measured after the twist ties had been subjected to pre-solidification drawing and after the twist ties had been cooled and fully solidified.

After being wound onto the spooler 32 of the system 10, the various ribbons 34 of the wireless twist tie of Examples 1–25 were cut into individual twist ties and tested in accordance with ASTM Standard No. D638-99 to determine the tensile strength at break, the tensile strength at yield, and the percent elongation at breakage. These values for the

TABLE 12

| EXAMPLE NO. | SPOOL NO. | SCREW SPEED (RPM) | HEAD PRES. (PSI) | HEAT ZONE TEMPERATURES (° F.) | | | | | | WATER BATH TEMP (° F.) | DIST. A DIE TO BATH (INCHES) |
|---|---|---|---|---|---|---|---|---|---|---|---|
| | | | | ZONE 1 | ZONE 2 | ZONE 3 | ZONE 4 | ZONE 5 | ZONE 6 | | |
| 1 | N/A | 20 | 1000 | 495 | 540 | 510 | 510 | 510 | 510 | 69 | 4.5 |
| 2 | 2 | 10 | 350 | 470 | 510 | 505 | 505 | 505 | 505 | 76 | 5 |
| 3 | 1 | 15 | 550 | 480 | 490 | 440 | 440 | 440 | 440 | 46 | 6 |
| 4 | 1 | 10 | 250 | 450 | 510 | 505 | 505 | 505 | 505 | 66 | 6 |
| 5 | N/A | N/A | N/A | N/A | N/A | N/A | N/A | N/A | N/A | N/A | N/A |
| 6 | 1 | 15 | 400 | 500 | 500 | 455 | 455 | 455 | 455 | 45 | 6.375 |
| 7 | 1 | 15 | 575 | 500 | 500 | 455 | 455 | 455 | 455 | 46 | 6.375 |
| 8 | 1 | 14–15 | 550 | 500 | 500 | 440 | 440 | 440 | 440 | 46 | 2 |
| 9 | 2 | 14–15 | 550 | 500 | 500 | 440 | 440 | 440 | 440 | 46 | 2 |
| 10 | 1 | 15 | 650 | 500 | 500 | 470 | 470 | 470 | 470 | 44 | 6.25 |
| 11 | 1 | 15 | 600 | 500 | 500 | 470 | 470 | 470 | 470 | 44 | 6.375 |
| 12 | 1 | 15 | 650 | 490 | 490 | 455 | 455 | 455 | 455 | 48 | 6.125 |
| 13 | 1 | 15 | 550 | 500 | 500 | 470 | 470 | 470 | 470 | 50 | 6.25 |
| 14 | 1 | 15 | 500 | 480 | 490 | 470 | 470 | 470 | 470 | 50 | 6.25 |
| 15 | 1 | 17 | 500 | 500 | 500 | 440 | 440 | 440 | 440 | 48 | 2.25 |
| 16 | 1 | 14 | 500 | 500 | 500 | 440 | 440 | 440 | 440 | 46 | 2.25 |
| 17 | 1 | 15 | 550 | 500 | 500 | 440 | 440 | 440 | 440 | 46 | 2 |
| 18 | 1 | 15 | 550 | 480 | 490 | 455 | 455 | 445 | 445 | 48 | 6.125 |
| 19 | 3 | 15 | 550 | 480 | 490 | 455 | 455 | 445 | 455 | 46 | 6 |
| 20 | 1 | 17 | 575 | 500 | 500 | 440 | 440 | 440 | 440 | 46 | 2 |
| 21 | 2 | 15 | 575 | 500 | 500 | 440 | 440 | 440 | 440 | 46 | 2 |
| 22 | 1 | 16 | 500 | 480 | 500 | 470 | 470 | 465 | 465 | 46 | 6.25 |
| 23 | 1 | 15 | 500 | 490 | 490 | 455 | 455 | 455 | 455 | 48 | 6.125 |
| 24 | 1 | 15 | 500 | 490 | 490 | 455 | 455 | 445 | 445 | 48 | 6.125 |
| 25 | 1 | 15 | 500 | 490 | 490 | 455 | 455 | 445 | 445 | 48 | 6.125 |

Different die opening configurations were used in Examples 1–25 to provide the ribbon 34 of the wireless twist tie produced in the system 10, upon exiting the die opening, tensile strength at break, the tensile strength at yield, and the percent elongation at breakage for the various wireless twist ties of Examples 1–25 are provided in Table 13 below.

TABLE 13

| EXAMPLE | WEIGHT/LENGTH | | TENSILE STRENGTH (PSI) @ | | % ELONGA- TION @ | | TWIST TIE DIMENSIONS | | | % OF TESTED TIES PASSING BURFORD TEST |
|---|---|---|---|---|---|---|---|---|---|---|
| | (g/10 ft) | (lb/1000 ft) | BREAK | YIELD | BREAKAGE | DIE | RIB DIAMETER (inches) | OVERALL TIE WIDTH (inches) | WING THICKNESS (inches) | |
| 1 | 4.724 | 1.041 | 11130 | 11020 | 37 | A | 0.0363 | 0.1334 | 0.0027 | 98 |
| 2 | 3.553 | 0.783 | 13380 | 12290 | 332 | B | 0.0350 | 0.0500 | No Wing | 100 |
| 3 | 3.138 | 0.692 | 10290 | 10220 | 198.9 | A | 0.0346 | 0.073 | 0.00172 | 100 |
| 4 | 4.274 | 0.942 | 13230 | 13050 | 205 | B | 0.0374 | 0.0550 | No Wing | 100 |
| 5 | N/A | N/A | N/A | N/A | N/A | N/A | N/A | N/A | N/A | 100 |

TABLE 13-continued

| | WEIGHT/LENGTH | | TENSILE STRENGTH (PSI) @ | | % ELONGA-TION @ | | TWIST TIE DIMENSIONS | | | % OF TESTED TIES PASSING |
| | | | | | | | RIB DIAMETER | OVERALL TIE WIDTH | WING THICKNESS | |
| EXAMPLE | (g/10 ft) | (lb/1000 ft) | BREAK | YIELD | BREAKAGE | DIE | (inches) | (inches) | (inches) | BURFORD TEST |
|---|---|---|---|---|---|---|---|---|---|---|
| 6 | 4.049 | 0.893 | 9991 | 9697 | 319.2 | C | 0.0283 | 0.1198 | 0.00134 | 100 |
| 7 | 4.179 | 0.921 | 9806 | 9702 | 232.5 | C | 0.02814 | 0.125 | 0.00154 | 100 |
| 8 | 4.267 | 0.941 | 9434 | 9360 | 110.5 | C | 0.02894 | 0.1314 | 0.00174 | 100 |
| 9 | 5.912 | 1.303 | 9374 | 9303 | 162.6 | C | 0.03384 | 0.153 | 0.002 | 100 |
| 10 | 4.047 | 0.892 | 9099 | 8744 | 356.5 | C | 0.02818 | 0.119 | 0.00142 | 100 |
| 11 | 4.11 | 0.906 | 9871 | 8358 | 575.6 | C | 0.02796 | 0.118 | 0.00156 | 100 |
| 12 | 4.398 | 0.970 | 8362 | 8323 | 202.7 | C | 0.02998 | 0.1226 | 0.0015 | 100 |
| 13 | 4.291 | 0.946 | 10460 | 8171 | 797.7 | C | 0.02912 | 0.1184 | 0.0015 | 100 |
| 14 | 3.963 | 0.874 | 9199 | 7401 | 665.1 | C | 0.02828 | 0.109 | 0.0015 | 100 |
| 15 | 4.822 | 1.063 | 8828 | 7849 | 458 | A | 0.0384 | 0.1464 | 0.0030 | 100 |
| 16 | 4.752 | 1.048 | 10040 | 8519 | 586 | A | 0.0386 | 0.147 | 0.0027 | 100 |
| 17 | 5.516 | 1.216 | 7768 | 7235 | 471 | C | 0.03378 | 0.141 | 0.00224 | 100 |
| 18 | 3.991 | 0.880 | 8407 | 6773 | 604.7 | C | 0.02842 | 0.112 | 0.00228 | 100 |
| 19 | 5.211 | 1.149 | 8602 | 6924 | 646.7 | C | 0.03268 | 0.13 | 0.0026 | 100 |
| 20 | 4.978 | 1.097 | 9349 | 7784 | 581.8 | A | 0.0388 | 0.1562 | 0.00314 | 100 |
| 21 | 3.795 | 0.837 | 8637 | 7301 | 503.8 | A | 0.03326 | .01298 | 0.0031 | 100 |
| 22 | 3.579 | 0.789 | 8752 | 6207 | 774 | C | 0.02772 | 0.1022 | 0.0016 | 100 |
| 23 | 3.551 | 0.783 | 7877 | 5395 | 665.1 | C | 0.02754 | 0.0866 | 0.0015 | 100 |
| 24 | 3.502 | 0.772 | 7622 | 5163 | 666.6 | C | 0.02822 | 0.086 | 0.0014 | 100 |
| 25 | 3.661 | 0.807 | 7547 | 5874 | 550.7 | C | 0.02712 | 0.0944 | 0.0016 | 100 |

A: Single Rib with two wings (Wireless Twist Tie Depicted in FIG. 3)
B: Single Rib without any wings (Wireless Twist Tie Depicted in FIG. 2)
C: Two Ribs with outer wings and internal wing between the ribs (Wireless Twist Tie Depicted in FIG. 5)

The details provided in Table 13 above illustrate that each of the wireless twist ties produced in accordance with these Examples 1–25 exhibited both tensile strength at yield and tensile strength at break of more than 5,000 psi. Also, the wireless twist ties produced in accordance with these examples, as illustrated in Table 13, frequently had tensile strengths at break and tensile strengths at yield greater than 7,000 psi. Additionally, nearly all of the twist ties of Examples 1–25 exhibited a percentage elongation at breakage of more than 100 percent, and the majority of the twist ties of these examples exhibited greater than 400 percent elongation at breakage. Furthermore, the majority of wireless twist ties of Examples 1–25 even exceeded 500 percent elongation at breakage.

Thus, predominantly all of the twist ties produced in Examples 1–25 meet and exceed the tensile strength at yield, tensile strength at breakage, and percent elongation at breakage values that support adequate performance of the inventive twist ties in high speed automated twist tie application and tying machinery. Furthermore, the vast majority of the twist ties produced in Examples 1–25 meet and exceed the preferred tensile strength at yield of about 8,000 psi or more, the preferred tensile strength at breakage of about 10,000 psi or more, and the preferred percent elongation at breakage of about 300% or more that support superior performance of the inventive twist ties in high speed automated twist tie application and tying machinery.

Manual manipulation of the twist ties produced in Examples 1–25 indicate that twist ties incorporating ULTRATHENE® UE 630-000 EVA in addition to EASTAR® PCTG 5445 copolyester had a softer feel than twist ties that incorporated EASTAR® PCTG 5445 copolyester, but not any ULTRATHENE® UE 630-000 EVA. This softer feel of the twist ties that included EVA was believed to be at least partially responsible for the observation that the twist ties incorporating EVA were easier to retie than twist ties of Examples 1–25 that did not include any EVA. The EVA content was also believed responsible for the enhanced percentage elongation at breakage and flexibility that was exhibited by many of the twist ties of Examples 1–25 that included EVA, as compared to twist ties of Examples 1–25 that did not include any EVA. All of the twist ties of Examples 1–25 that included both EVA and PCTG exhibited a 100% pass rate upon testing in high speed automated twist tie application and tying machinery obtained from Burford Corporation. This indicates that none of the twist ties of Examples 1–25 that included both EVA and PCTG either broke or otherwise extracted from performance of the Burford Corporation high speed automated twist ie application and tying machinery. Similar results were obtained when the twis ties of Example 1–25 were applied and tied using hand-fed twist tie application and tying machinery of the MINI series available from Comiz SRL.

After preparation, samples of the twist ties of Examples 5, 13, 15, and 23 were subjected to different periods of heating in an oven at 120° F. to simulate the effect of aging on various properties, such as weight per length, tensile strength at break, tensile strength at yield, percent elongation at breakage, and different twist tie dimensions. Detail about the values of these different properties at different times during the oven-base aging are provided in Table 14 below.

TABLE 14

| TWIST TIE PRODUCED IN EXAMPLE | TWIST TIE AGED FOR HOW MANY HOURS AT 120° F. | WEIGHT/LENGTH | | TENSILE STRENGTH (PSI) @ | | % ELONGATION @ BREAKAGE | TWIST TIE DIMENSIONS | | |
|---|---|---|---|---|---|---|---|---|---|
| | | (g/10 ft) | (lb/1000 ft) | BREAK | YIELD | | RIB DIAMETER (inches) | OVERALL TIE WIDTH (inches) | WING THICKNESS (inches) |
| 5 | 0 | 3.904 | 0.861 | 10710 | 10650 | 106 | 0.02732 | 0.0954 | 0.00136 |
|  | 24 | 3.908 | 0.862 | 11580 | 11540 | 28.88 | 0.02752 | 0.0996 | 0.00148 |
|  | 48 | 3.977 | 0.877 | 11650 | 11620 | 30.87 | 0.02776 | 0.1058 | 0.00148 |
|  | 72 | 3.999 | 0.882 | 11750 | 11690 | 32.91 | 0.0277 | 0.1026 | 0.00144 |
|  | 96 | 3.977 | 0.877 | 11510 | 11480 | 29.93 | 0.02802 | 0.1054 | 0.00146 |
|  | 105 | 3.955 | 0.872 | 11550 | 11510 | 28.49 | 0.02796 | 0.1076 | 0.0014 |
| 13 | 0 | 4.457 | 0.983 | 8195 | 7857 | 263.6 | 0.02982 | 0.1254 | 0.0015 |
|  | 24 | 4.352 | 0.959 | 9867 | 9834 | 93.48 | 0.0295 | 0.1238 | 0.0016 |
|  | 48 | 4.396 | 0.969 | 10040 | 10000 | 70.5 | 0.02948 | 0.1236 | 0.00160 |
|  | 72 | 4.382 | 0.966 | 9848 | 9778 | 132.6 | 0.02952 | 0.1242 | 0.0015 |
|  | 96 | 4.421 | 0.975 | 9722 | 9679 | 131.9 | 0.02944 | 0.1224 | 0.0015 |
|  | 105 | 4.415 | 0.973 | 10320 | 10290 | 91.96 | 0.02932 | 0.122 | 0.0016 |
| 15 | 0 | 4.151 | 0.915 | 9637 | 8120 | 732.6 | 0.02862 | 0.1128 | 0.0016 |
|  | 24 | 4.131 | 0.911 | 9280 | 8957 | 562.5 | 0.02866 | 0.1148 | 0.0017 |
|  | 48 | 4.165 | 0.918 | 9234 | 8973 | 553.5 | 0.029 | 0.1138 | 0.0016 |
|  | 72 | 4.168 | 0.919 | 9124 | 9095 | 407.6 | 0.02894 | 0.1156 | 0.0016 |
|  | 96 | 4.16 | 0.917 | 8915 | 8844 | 432.8 | 0.02874 | 0.114 | 0.0017 |
|  | 105 | 4.111 | 0.906 | 9466 | 9280 | 421 | 0.286 | 0.1142 | 0.0015 |
| 23 | 0 | 3.948 | 0.870 | 8024 | 6343 | 646.7 | 0.02866 | 0.1018 | 0.0017 |
|  | 24 | 3.926 | 0.866 | 8195 | 7389 | 569.4 | 0.0286 | 0.1024 | 0.0015 |
|  | 48 | 3.908 | 0.862 | 9281 | 7529 | 733.5 | 0.02856 | 0.0998 | 0.00138 |
|  | 72 | 3.904 | 0.861 | 8112 | 7586 | 533.2 | 0.02848 | 0.1016 | 0.00154 |
|  | 96 | 4.553 | 1.004 | 8965 | 7700 | 710.1 | 0.02858 | 0.1006 | 0.00148 |
|  | 105 | 3.893 | 0.858 | 8190 | 7763 | 457.4 | 0.02842 | 0.1004 | 0.0015 |

There are some minor variations between the "zero time" data for tensile 40 strength at break, tensile strength at yield, percent elongation at breakage, and dimensions provided in Table 14 above for Examples 5, 13, 15, and 23 and the Table 12 and Table 13 data for tensile strength at break, tensile strength at yield, percent elongation at breakage, and dimensions of the twist ties of Examples 5, 13, 15, and 23. These minor changes are believed to be a result of several days of delay between production (and initial measurement) of the twist ties and initiation of the simulated aging test.

Figure 10:
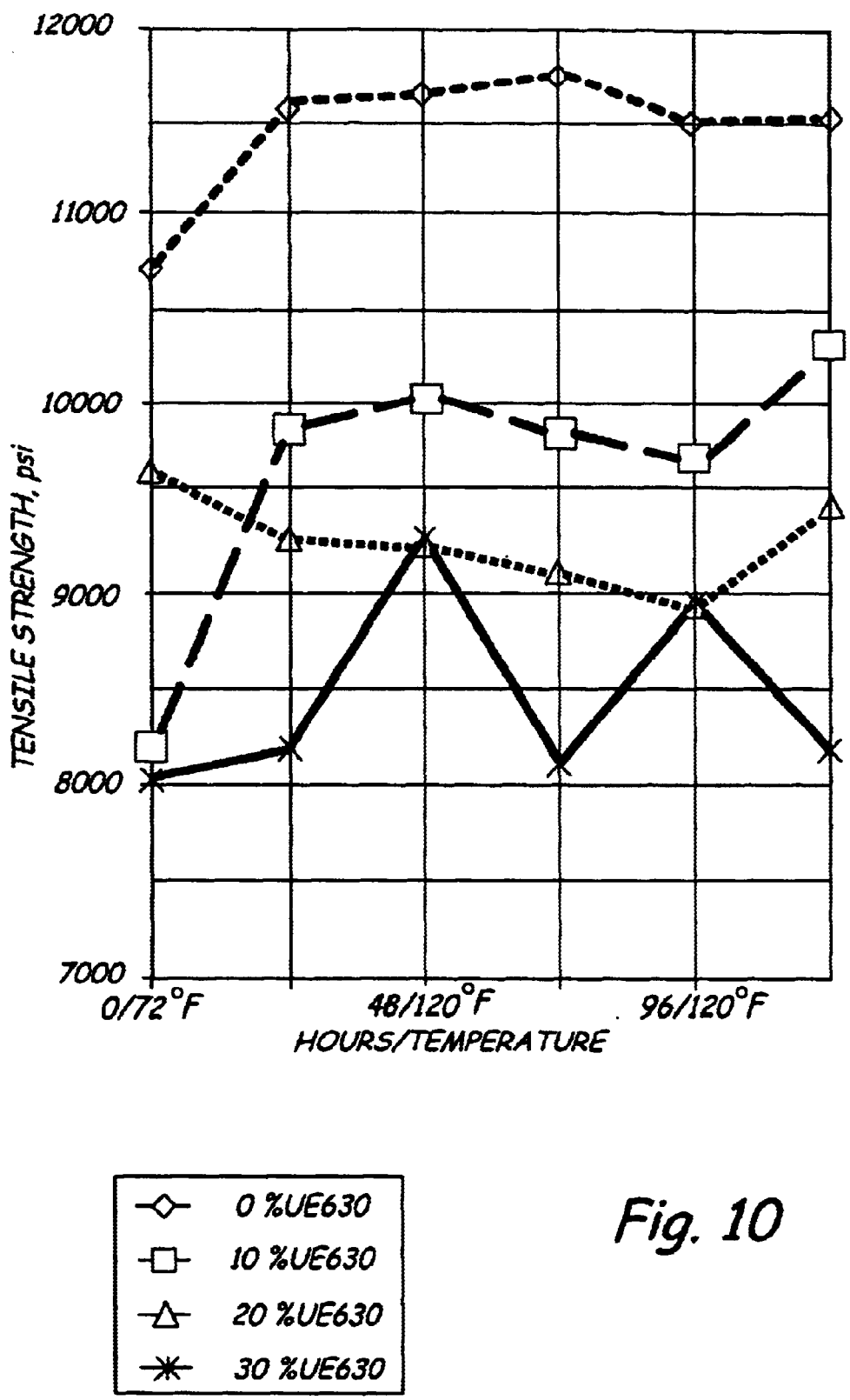
FIG. 10 is a graph depicting changes in tensile strength at breakage for different aging periods for wireless twist ties produced in accordance with the present invention.
Figure 11:
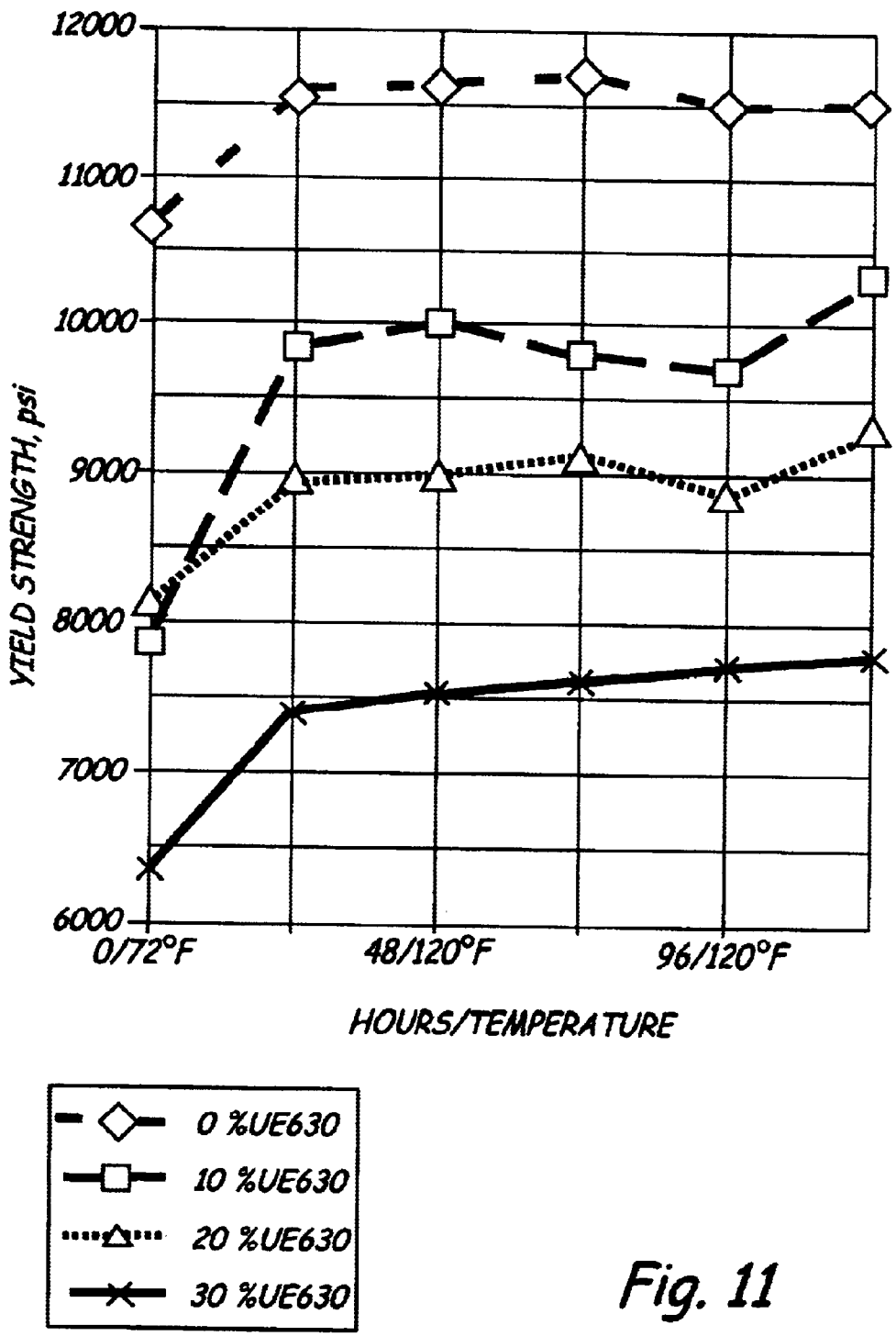
FIG. 11 is a graph depicting changes in tensile strength at yield for different aging periods for wireless twist ties produced in accordance with the present invention.
Figure 12:
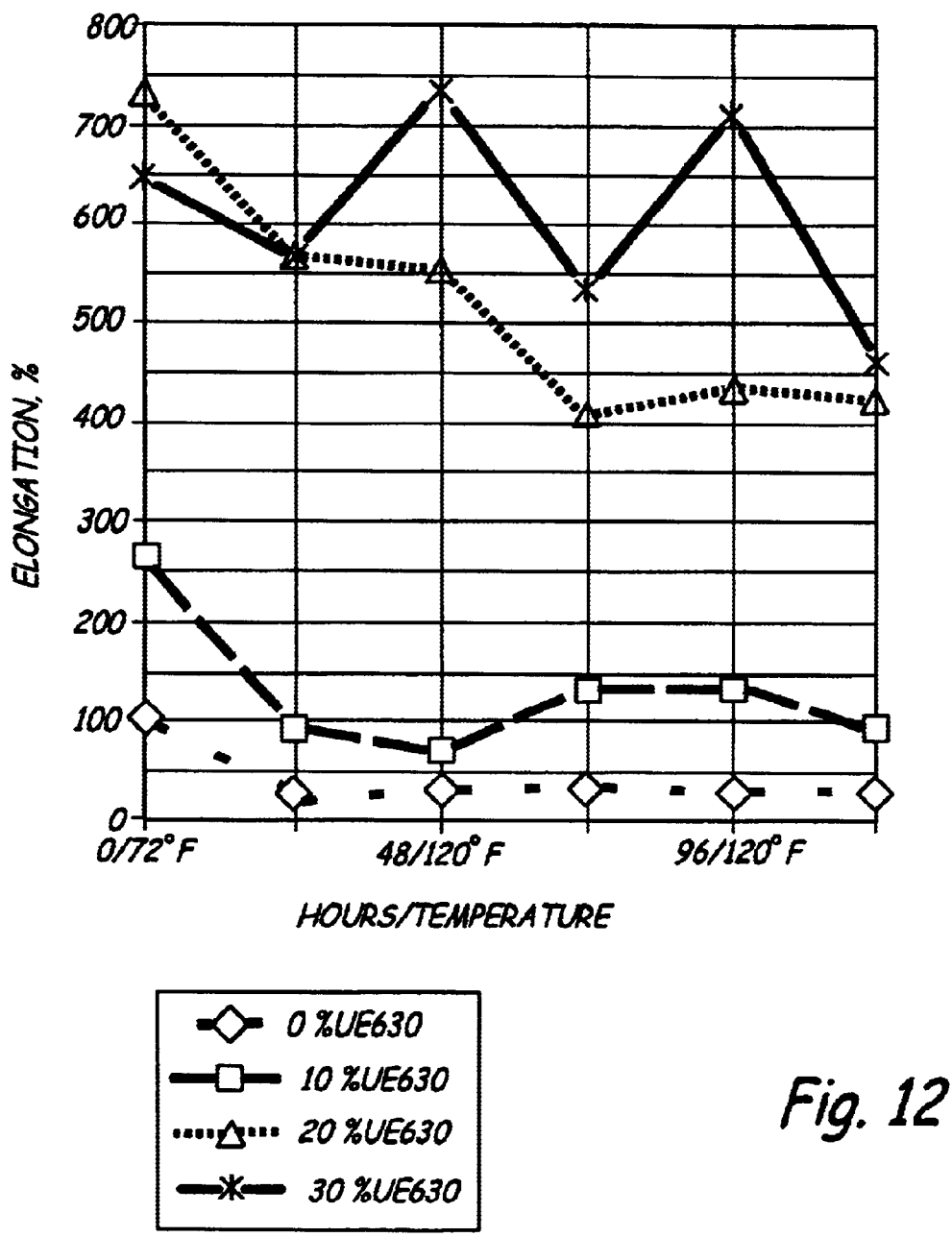
FIG. 12 is a graph depicting changes in percent elongation at break for different aging periods for wireless twist ties produced in accordance with the present invention.

The data provided in Table 14 for tensile strength at break, tensile strength at yield, and percent elongation at breakage are reproduced in graphical form in FIGS. 10, 11, and 12, respectively. The results presented in FIG. 10 demonstrate that the simulated aging generally increased the tensile strength at breakage for twist ties formed of PCTG that either excluded EVA or included only low amounts of EVA on the order of about 10 weight percent, based upon the total weight of the twist tie. The results presented in FIG. 11 demonstrate that the simulated aging generally increased the tensile strength at yield for twist ties formed of PCTG that either excluded EVA or included EVA at concentrations ranging up to about 30 weight percent, based upon the total weight of the twist tie. The results presented in FIG. 12 demonstrate that twist ties including EVA in addition to PCTG tended to maintain a greater percentage of the elongation at breakage percentage that existed at the onset of the simulated aging, as compared to twist ties that did not include any PCTG.

Although the present invention has been described with reference to preferred embodiments, workers skilled in the art will recognize that changes may be made in form and detail without departing from the spirit and scope of the invention.

What is claimed is:

1. A method of making a twist tie, the method comprising:
preparing a composition, the composition comprising a thermoplastic copolyester;
shaping the composition to form the twist tie, the shaping comprising extruding a ribbon; and
cooling the ribbon in a fluid medium to solidify the composition.

2. The method of claim 1, the method further comprising drawing down the ribbon in a ratio ranging from about 3:1 to about 20:1.

3. The method of claim 1 wherein the twist tie is wireless.

4. The method of claim 1 wherein the twist tie is free of metal.

5. The method of claim 1 wherein the twist tie is free of magnetic metal.

6. The method of claim 1, the method further comprising incorporating an ethylene-based copolymer in the composition.

7. The method of claim 6 wherein the concentration of the ethylene-based copolymer in the composition ranges from about 0.5 weight percent to about 60 weight percent, based upon the total weight of the composition.

8. The method of claim 6 wherein the ethylene-based copolymer comprises an acetate group, an acidic carboxyl group or a $C_3H_3O_2$— radical.

9. The method of claim 1 wherein the thermoplastic copolyester is glycol-modified or acid-modified copolyester that comprises

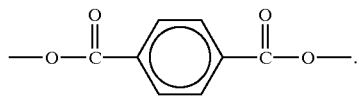

10. The method of claim,wherein the thermoplastic copolyester is a glycol-modified or acid-modified copolyester that comprises a terephthalic group.

11. The method of claim 1 wherein the thermoplastic copolyester is a glycol-modified copolyester of polycyclohexylene dimethylene terephthalate, a glycol-modified copolyester of polyethylene terephthalate, an acid-modified copolyester of polycyclohexylene dimethylene terephthalate, or any of these in any combination.

12. The method of claim 1 wherein the thermoplastic copolyester is glycol-modified poly(1,4 cyclohexylene dimethylene terephthalate).

13. The method of claim 12 wherein the concentration of the thermoplastic copolyester ranges from about 55 weight percent to about 100 weight percent, based upon the total weight of the composition.

14. The method of claim 1, the method further comprising drawing down the ribbon after solidifying the composition.

15. The method of claim 1, the method further comprising drawing down the ribbon prior to cooling the ribbon in the fluid medium.

16. The method of claim 15, the method further comprising drawing down the ribbon after solidifying the composition.

17. The method of claim 15 wherein the fluid medium is a liquid.

18. The method of claim 15 wherein the fluid medium is water.

19. The method of claim 15 wherein the pre-cooling draw down is at a ratio ranging from about 3:1 to about 20:1.

20. The method of claim 15 wherein the twist tie exhibits an elongation at breakage of about 100 percent or more, when analyzed according to the ASTM D-638-99 standard.

21. The method of claim 20 wherein the twist tie exhibits a tensile strength at yield of about 7,000 psi or more when, analyzed according to the ASTM D-638-99 standard.

22. The method of claim 15 wherein the twist tie exhibits a tensile strength at yield of about 7,000 psi or more, when analyzed according to the ASTM D-638-99 standard.

23. The method of claim 22 wherein the twist tie exhibits a tensile strength at breakage of about 8,000 psi or more, when analyzed according to the ASTM D-638-99 standard.

24. The method of claim 15 wherein the twist tie exhibits a tensile strength at breakage of about 8,000 psi or more, when analyzed according to the ASTM D-638-99 standard.

25. The method of claim 24 wherein the twist tie exhibits an elongation at breakage of about 100 percent or more, when analyzed according to the ASTM D-638-99 standard.

26. The method of claim 15 wherein the twist tie exhibits an elongation at breakage of about 300 percent or more, when analyzed according to the ASTM D-638-99 standard.

27. The method of claim 26 wherein the twist tie exhibits a tensile strength at yield of about 8,000 psi or more when, analyzed according to the ASTM D-638-99 standard.

28. The method of claim 15 wherein the twist tie exhibits a tensile strength at yield of about 8,000 psi or more, when analyzed according to the ASTM D-638-99 standard.

29. The method of claim 28 wherein the twist tie exhibits a tensile strength at breakage of about 10,000 psi or more, when analyzed according to the ASTM D-638-99 standard.

30. A method of making a twist tie, the method comprising:
preparing a composition, the composition comprising a thermoplastic copolyester and an ethylene-based copolymer, the ethylene-based copolymer being ethylene vinyl acetate, ethylene acrylic acid, ethylene ethyl acrylate, ethylene methyl acrylate, or any of these in any combination; and
shaping the composition to form the twist tie.

31. The method of claim 30 wherein the concentration of the ethylene-based copolymer in the composition ranges from about 0.5 weight percent to about 60 weight percent, based upon the total weight of the composition.

32. The method of claim 30 wherein shaping the composition comprises extruding a ribbon.

33. A method of making a twist tie, the method comprising:
preparing a composition, the composition comprising a thermoplastic copolyester; and
shaping the composition to form the twist tie, the twist tie exhibiting an elongation at breakage of about 100 percent or more, a tensile strength at yield of about 7,000 psi or more, and a tensile strength at breakage of about 8,000 psi or more, when analyzed according to the ASTM D-638-99 standard.

34. A method of making a twist tie, the method comprising:
preparing a composition, the composition comprising a thermoplastic copolyester; and
shaping the composition to form the twist tie, the twist tie exhibiting an elongation at breakage of about 300 percent or more, a tensile strength at yield of about 8,000 psi or more, or a tensile strength at breakage of about 10,000 psi or more, when analyzed according to the ASTM D-638-99 standard.

35. The method of claim 34 wherein the twist tie exhibits a tensile strength at breakage of about 10,000 psi or more, when analyzed according to the ASTM D-638-99 standard.

36. The method of claim 34 wherein the twist tie exhibits an elongation at breakage of about 300 percent or more, when analyzed according to the ASTM D-638-99 standard.

* * * * *

UNITED STATES PATENT AND TRADEMARK OFFICE
CERTIFICATE OF CORRECTION

PATENT NO.    : 6,663,809 B1  
DATED         : December 16, 2003  
INVENTOR(S)   : Thomas E. Haddock et al.

It is certified that error appears in the above-identified patent and that said Letters Patent is hereby corrected as shown below:

Column 32,
Line 62, after "claim", insert -- 1 --

Signed and Sealed this

Ninth Day of August, 2005

JON W. DUDAS
*Director of the United States Patent and Trademark Office*